United States Patent [19]

Schmidt et al.

[11] Patent Number: 5,248,739
[45] Date of Patent: Sep. 28, 1993

[54] SILICONE PRESSURE SENSITIVE ADHESIVES HAVING ENHANCED ADHESION TO LOW ENERGY SUBSTRATES

[75] Inventors: Randall G. Schmidt, Midland; William P. Brady, Sanford; Gary A. Vincent; Kyuha Chung, both of Midland, all of Mich.

[73] Assignee: Dow Corning Corporation, Midland, Mich.

[21] Appl. No.: 960,634

[22] Filed: Oct. 14, 1992

Related U.S. Application Data

[63] Continuation-in-part of Ser. No. 779,227, Oct. 18, 1991, abandoned.

[51] Int. Cl.⁵ .......................................... C08F 283/12
[52] U.S. Cl. .................................. 525/477; 525/478; 428/447
[58] Field of Search ................. 525/477, 478; 428/447

[56] References Cited

U.S. PATENT DOCUMENTS

| | | | |
|---|---|---|---|
| 3,627,851 | 12/1971 | Brady | 260/825 |
| 3,929,704 | 12/1975 | Horning | 260/29.15 B |
| 4,143,088 | 3/1979 | Favre et al. | 260/825 |
| 4,535,141 | 8/1985 | Kroupa | 528/15 |
| 4,774,297 | 9/1988 | Murakami et al. | 525/478 |
| 4,831,070 | 5/1989 | McInally et al. | 524/267 |
| 4,988,779 | 1/1991 | Medford et al. | 525/478 |
| 5,034,061 | 7/1991 | Maguire et al. | 106/287.14 |
| 5,091,494 | 2/1992 | Colas et al. | 525/477 |
| 5,100,976 | 3/1992 | Hamada et al. | 525/477 |

FOREIGN PATENT DOCUMENTS

| | | |
|---|---|---|
| 195936 | 2/1986 | European Pat. Off. . |
| 0255226 | 6/1987 | European Pat. Off. . |
| 0269454 | 11/1987 | European Pat. Off. . |

OTHER PUBLICATIONS

Silicones for Pressure Sensitive Adhesives by Silicone Product Data (GE) CDS-4138 (2 pages).

Primary Examiner—Melvyn I. Marquis
Assistant Examiner—Margaret W. Glass
Attorney, Agent, or Firm—Alexander Weitz

[57] ABSTRACT

There is disclosed a pressure-sensitive adhesive composition based on a silicone resin and a polydiorganosiloxane polymer wherein the resin component has a number average molecular weight of about 950 to 1,600 and consists essentially of triorganosiloxy (M) units and silicate (Q) units wherein the molar ratio M/Q is in the range 1.1/1 to 1.4/1, inclusive. The adhesives of the invention exhibit improved adhesion to low energy substrates such as polyethylene and polytetrafluoroethylene.

51 Claims, 2 Drawing Sheets

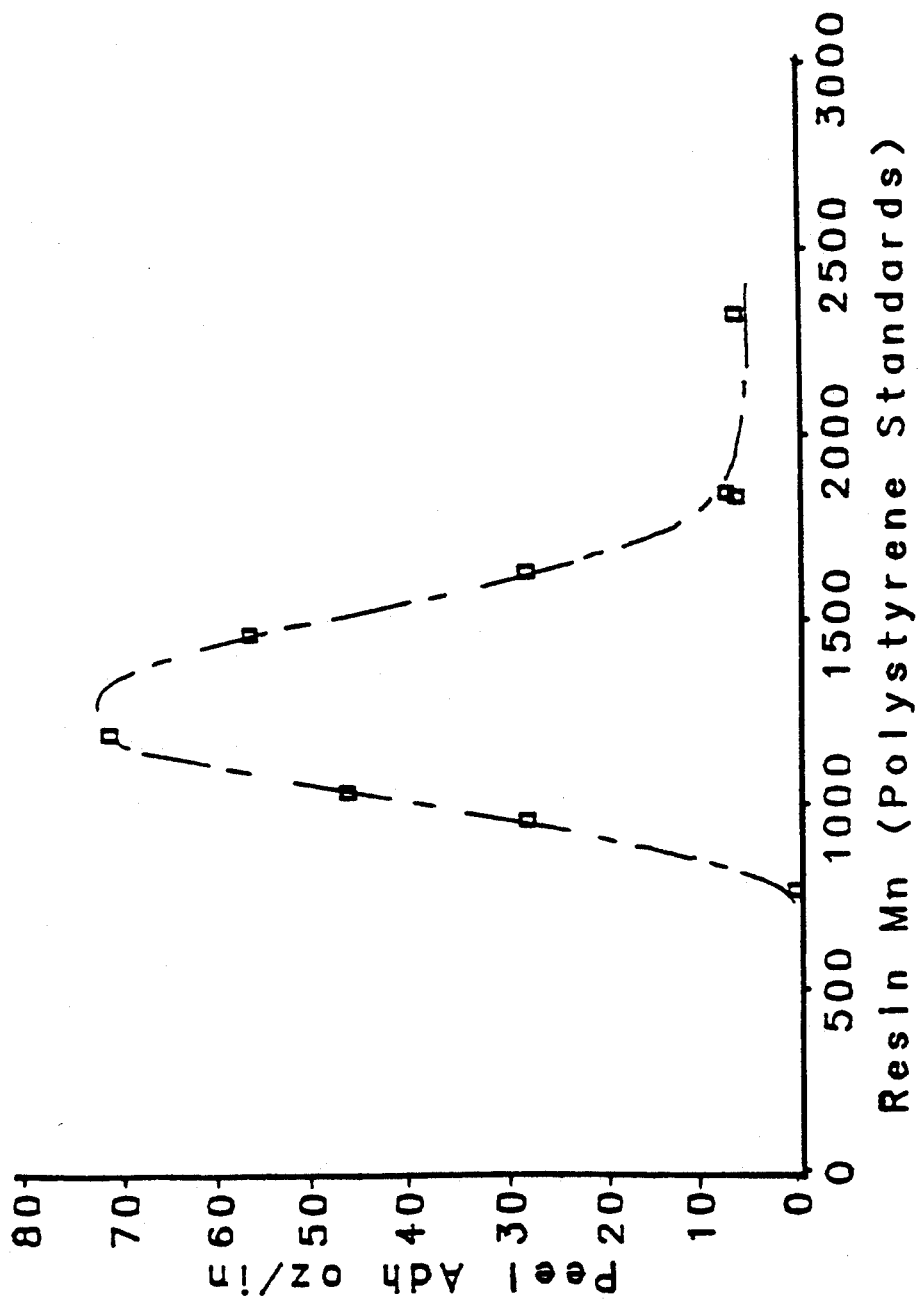

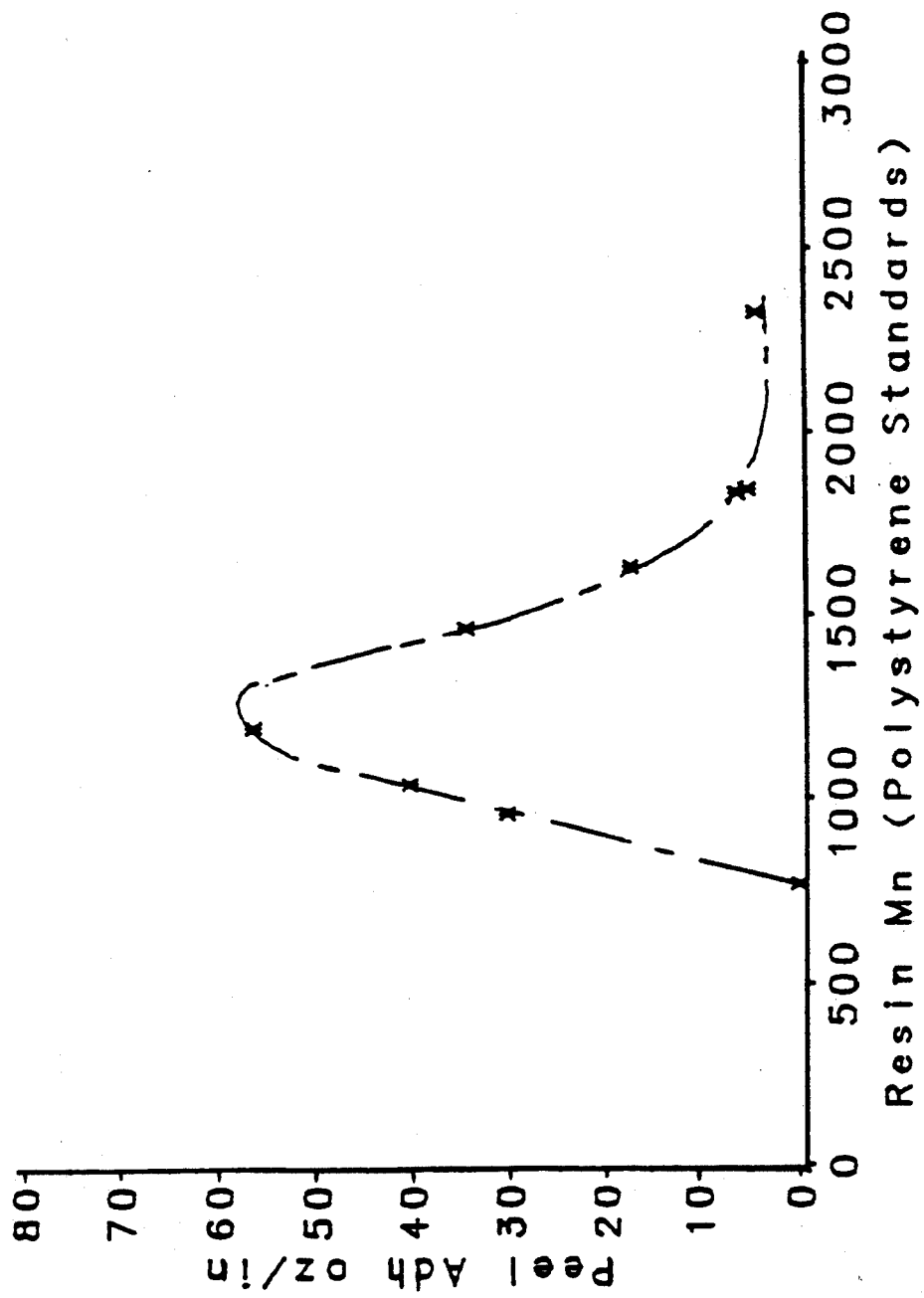

SILICONE PRESSURE SENSITIVE ADHESIVES HAVING ENHANCED ADHESION TO LOW ENERGY SUBSTRATES

REFERENCE TO RELATED APPLICATION

This application is a continuation-in-part of Ser. No. 779,227, filed Oct. 18, 1991, now abandoned.

FIELD OF THE INVENTION

The present invention relates to silicone pressure sensitive adhesives which comprise a resin component and a polymer component, said adhesives having enhanced adhesion to low energy substrates. More particularly, the adhesives of the invention employ silicone resins which have a critical molecular weight as well as a critical ratio of triorganosiloxy units to silicate units in their molecules.

BACKGROUND OF THE INVENTION

Silicone pressure sensitive adhesives (hereinafter also referred to as PSAs) typically contain at least two primary components, namely a linear siloxane polymer and a tackifier resin consisting essentially of triorganosiloxane (M) units (i.e., $R_3SiO_{1/2}$ units, in which R denotes a monovalent organic group) and silicate (Q) units (i.e., $SiO_{4/2}$ units). Such "MQ" resins which have heretofore been used to prepare silicone PSA compositions generally have M/Q (molar) ratios in the range of about 0.6 to 0.9. Furthermore, the prior silicone PSA art known to applicants generally does not attribute any significance to the molecular weight of these MQ resins. Where the molecular weight is discussed to any extent, the prior art does not suggest any criticality thereof in connection with the above mentioned M/Q ratios.

Thus, EPO Publication No. 0,255,226 to Minnesota Mining and Manufacturing Company (Copley et al.) teaches silicone pressure-sensitive adhesives (PSAs) containing (a) a high molecular weight polydimethylsiloxane gum (or copolymer) and (b) an MQ resin having a polydispersity of $\leq 2.0$ wherein the M/Q ratio is 0.5 to 1.0. In this disclosure, the inventors prepare narrow fractions of a commercial MQ resin (GE-545). When these resin fractions are used in place of the total resin in the formulation of PSA compositions, the former exhibit superior adhesive performance.

Likewise, where the prior art does disclose a broader range of the above mentioned M/Q ratio, it does not suggest the combination of a specific ratio range and a specific molecular weight range to obtain improved adhesive characteristics. For example, U.S. Pat. No. 3,929,704 to Horning teaches a silicone PSA comprising MQ resin, silicone gum and a curing agent, wherein the curing agent is a peroxide admixed with a plasticizer and an extender. While the Horning patent teaches the broad range of M/Q of 0.5 to 1.5, it is silent with respect to any molecular weight limitations to be placed on the silicone resin and the preferred range of M/Q is stated to be 0.55 to 0.75.

Moreover, the prior art silicone PSA compositions generally employ a resin/polymer ratio of about 40/60 to about 60/40 by weight and do not suggest the relatively high resin/polymer ratios contemplated in the instant compositions.

SUMMARY OF THE INVENTION

Although molecular weight of the various resin fractions is noted by Copley et al., the focus of these inventors is on the narrow molecular weight distributions of the resins. Moreover, Copley et al. teach away from the use of resins having an M/Q ratio of less than 0.5 or greater than 1.0. There is therefore no suggestion provided by this reference to form a silicone PSA using a silicone resin exhibiting a different range of this M/Q parameter, particularly in combination with a critical molecular weight range for said resin. Neither the application to Copley et al., nor any other art known to applicants, suggests the preparation of silicone PSAs from silicone resins having a molecular weight in the range of 950 to 1600 and at the same time having an M/Q ratio of 1.1 to 1.4, wherein the resin/polymer weight ratio is in the range of 60/40 to 90/10. Unlike the resin fractions of Copley et al., the unfractionated resins of the instant invention are not restricted to a polydispersity of $\leq 2.0$. When formulated into silicone PSAs, these resins impart improved adhesion to low energy substrates, such as polyethylene and polytetrafluoroethylene (e.g., Teflon ™).

The present invention therefore relates to a silicone pressure sensitive adhesive composition which contains:

(A) 60 to 90 parts by weight of a soluble organopolysiloxane having a $M_n$ value of about 950 to 1,600 and consisting essentially of $R_3SiO_{1/2}$ siloxane units and $SiO_{4/2}$ siloxane units wherein each R denotes a monovalent radical selected from the group consisting of hydrocarbon and halogenated hydrocarbon radicals, at least $\frac{1}{2}$ of all R radicals being methyl and the mole ratio of $R_3SiO_{1/2}$ siloxane units to $SiO_{4/2}$ siloxane units in the soluble organopolysiloxane having a value of from 1.1/1 to 1.4/1; and (B) 10 to 40 parts by weight of a polydiorganosiloxane having the general formula $R^1R^2_2SiO(R^2_2SiO)_n\text{-}SiR^2_2R^1$ wherein each $R^2$ denotes a monovalent radical selected from the group consisting of hydrocarbon and halogenated hydrocarbon radicals, at least $\frac{1}{2}$ of all $R^2$ radicals being methyl, each $R^1$ denotes a radical selected from the group consisting of $R^2$ radicals and OH radicals and the subscript n is a number having an average value of at least 50.

BRIEF DESCRIPTION OF THE DRAWINGS

FIG. 1 is a plot of peel adhesion of silicone PSAs from a polyethylene substrate as a function of number average molecular weight of resin employed at an optimum loading.

FIG. 2 is a plot of peel adhesion of silicone PSAs from a PTFE substrate as a function of number average molecular weight of resin employed at an optimum loading.

DETAILED DESCRIPTION OF THE INVENTION

The silicone pressure sensitive adhesive compositions of the present invention can be grouped into four separate systems: System I relates to silicone pressure sensitive adhesive compositions that provide very high tack and peel adhesion to substrates including low surface energy materials such as polyolefins and polytetrafluoroethylene; System II relates to silicone pressure sensitive adhesive compositions that provide higher temperature cohesive strength than the silicone pressure sensitive adhesives of System I; System III relates to silicone pressure sensitive adhesive compositions that require less solvent for coating viscosity adjustment than the adhesives of System II; and System IV relates to compositions which contain <1% by weight of volatile components.

Organopolysiloxane (A)

Component (A) of the present invention is a soluble organopolysiloxane consisting essentially of $R_3SiO_{\frac{1}{2}}$ siloxane units and $SiO_{4/2}$ siloxane units. By the term soluble it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is soluble in component (B), delineated below.

In the formula for component (A) R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloalphatic radicals, such as cyclohexyl; aryl radicals such as phenyl, tolyl, xylyl, benzyl and 2-phenylethyl; alkenyl radicals such as vinyl; and chlorinated hydrocarbon radicals such as 3-chloropropyl and dichlorophenyl.

To enhance the solubility of component (A) in component (B), it is desirable to select the predominant R radicals of the former to match the predominant $R^2$ radicals of the latter. Preferably, at least one-third, and more preferably substantially all R radical in the formula for component (A), are methyl radicals. The methyl radicals can be distributed in any desired arrangement among the $R_3SiO_{\frac{1}{2}}$ siloxane units; however, it is preferred that each $R_3SiO_{\frac{1}{2}}$ siloxane unit bear at least one, and more preferably at least two, methyl radicals. Examples of preferred $R_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me hereinafter denotes methyl and Ph hereinafter denotes phenyl.

Component (A) includes a resinous portion wherein the $R_3SiO_{\frac{1}{2}}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane, and some are bonded only to other $SiO_{4/2}$ siloxane unit. In addition to the resinous portion, component (A) contains a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, the resinous portion of component (A) must have a number average molecular weight ($M_n$) of about 950 to 1,600 when measured by gel permeation chromatography (GPC), the neopentamer peak being excluded from the measurement. In this molecular weight determination, conventional polystyrene (PS) molecular weight standards are employed to calibrate the chromatographic apparatus. It has also been found that narrow fractions of MQ resins can be used to calibrate the GPC equipment when the absolute molecular weights thereof are first measured by a technique such as vapor phase osmometry. This latter $M_n$ is directly related to the value obtained using the PS standards. For example, in the case of MQ resins based on $(CH_3)_3SiO_{\frac{1}{2}}$ siloxane units and $SiO_{4/2}$ siloxane units, we have determined that the relation between these two standards is:

$$M_n \text{ (resin)} = 2.77 \, M_n(PS) - 736$$

wherein the correlation coefficient of the linear regression is $R = 0.995$ and wherein each GPC determination was run using an identical column set, solvent, flow rate and temperature, as described infra. Thus, $M_n$ measurements obtained with resin standards in some of the examples shown below are completely convertible to the corresponding $M_n$ values using the PS standards. Unless stated to the contrary, the $M_n$ values reported hereinbelow refer to the PS standard and are therefore consistent with convention in the art.

It is preferred that component (A) has an $M_n$ value of from about 1,200 to 1,300 and consists of $(CH_3)_3SiO_{\frac{1}{2}}$ siloxane units and $SiO_{4/2}$ siloxane units, some of which bear silicon-bonded hydroxyl.

Another key requirement of the instant invention is that the mole ratio of the total M siloxane units to total Q siloxane units of the resin be between 1.1 and 1.4, preferably about 1.1 to 1.3. Although this ratio is generally inversely related to the molecular size of the average resin particle, the correlation is, at best, only approximate. The above M/Q mole ratios can be easily obtained by $^{29}Si$ nuclear magnetic resonance, this technique being capable of a quantitative determination of the molar contents of: M (resin), M(neopentomer), Q (resin), Q(neopentomer) and TOH. For the purposes of the present invention, as implicitly stated supra, the ratio of $$\{M(\text{resin}) + M(\text{neopentomer})\}/\{Q(\text{resin}) + Q(\text{neopentomer})\}$$

must be between 1.1 and 1.4. Hereinafter, for the sake of conciseness, and unless indicated to the contrary, M/Q represents the ratio of the total number of triorganosiloxy groups of the resinous and neopentamer portions of (A) to the total number of silicate groups of the resinous and neopentamer portions of (A).

Component (A) can be prepared by any method providing said method provides a soluble organopolysiloxane consisting essentially of $R_3SiO_{\frac{1}{2}}$ siloxane units and $SiO_{4/2}$ siloxane units and having a $M_n$ value of from about 950 to 1,600 and an M/Q ratio of 1.1, to 1.4. Component (A) is preferably prepared by the silica hydrosol capping process of Daudt, et al.. U.S. Pat. No. 2,676,182; as modified by Brady. U.S. Pat. No. 3,627.851; and Flannigan, U.S. Pat. No. 3,772.247; each patent being incorporated herein by reference to teach how to prepare soluble organopolysiloxanes which meet the requirements of the present invention.

Briefly stated, the modified process of Daudt et al. comprises limiting the concentration of the sodium silicate solution, and/or the silicon-to-sodium ratio in the sodium silicate, and/or the time before capping the neutralized sodium silicate solution to generally lower values than those disclosed by Daudt et al. in order to prevent excessive growth of the silica particles and to obtain a soluble organopolysiloxane having the required $M_n$. Thus, for the purposes of the present invention, the silicate concentration is generally limited to a value of 40 to 120, preferably 60 to 100, and most preferably about 75 grams/liter. The neutralized silica hydrosol is preferably stabilized with an alcohol, such as isopropanol, and capped with $R_3SiO_{\frac{1}{2}}$ siloxane units as soon as possible, preferably within 30 seconds, after being neutralized. The sodium silicate employed preferably has the formula $Na_2O \cdot xSiO_2$, wherein x has a value of 2 to less than 3.5.

It is important to note that the level of the silicon bonded hydroxyl groups on the organopolysiloxane, component (A), may be reduced, preferably to less than about 1 weight percent. This may be accomplished, for example, by reacting hexamethyldisilazane with the organopolysiloxane. Such a reaction may be catalyzed, for example, with trifluoroacetic acid. Alternatively, trimethylchlorosilane or trimethylsilylacetamide may be reacted with the organopolysiloxane, a catalyst not being necessary in this case. Such modified forms of component (A) fall within the definitional requirements of component (A).

Polydiorganosiloxane (B)

Component (B) of the present invention is a polydiorganosiloxane having the general formula $R^1R^2_2SiO(R^2_2SiO)_nSiR^2_2R^1$. In this formula each $R^2$ denotes a monovalent radical selected from the group consisting of hydrocarbon and halogenated hydrocarbon radicals and each $R^1$ denotes a radical selected from the group consisting of $R^2$ radicals and OH radicals. Examples of $R^2$ radicals include the hydrocarbon and halogenated hydrocarbon radicals delineated above for R, as well as monovalent hydrocarbon radicals which contain olefinic unsaturation, such as alkenyl and cycloalkenyl radicals, examples thereof being vinyl, allyl, butenyl, hexenyl, cyclohexenyl and beta-cyclohexenylethyl. Component (B) can be comprised of a single polydiorganosiloxane or a mixture of two or more different polydiorganosiloxanes.

Component (B) will typically comprise a polydiorganosiloxane in which at least 50%, and preferably at least 85%, of the $R^2$ radicals are methyl radicals. The methyl radicals can be distributed in any manner in the polydiorganosiloxane. $R^1$ can be any $R^2$ radical or a hydroxyl radical. For example both $R^1$ radicals can be $R^2$, such as methyl, vinyl or phenyl, or hydroxyl. Alternatively the $R^1$ radicals can be different, such as methyl and vinyl or methyl and hydroxyl. In addition, component (B) can comprise trace amounts of siloxane branching sites, such as $R^2SiO_{3/2}$ units and $SiO_{4/2}$ units, provided that the component remains flowable.

Component (B) preferably consists essentially of a polydiorganosiloxane having the general formula $R''R'_2SiO(R'_2SiO)_nSiR'_2R''$ wherein each R' denotes methyl, phenyl or alkenyl, at least 85 percent of which are the methyl radical, and each R" denotes a radical selected from the group consisting of R' radicals and OH radicals. The average values of the subscript n in the above formula depend on the type of PSA being prepared. For formulations which include sufficient solvent to impart a practical working viscosity to the final PSA composition, such as Systems I to III, the average value of n is typically greater than about 200. On the other hand, when PSA compositions having less than about 1 weight percent volatile compounds are desired (so-called "solventless" or System IV PSAs), the average value of n should be about 50 to about 200 in order to produce a final PSA having a practical working viscosity. For the purposes of the present invention, the volatile content of such a solventless system is determined by heating a two gram sample of the material to 150° C. for one hour and noting the weight of the residue.

The average value of n used should preferably provide an organopolysiloxane component (B) having a viscosity at 25° C. of about 50 millipascal-seconds (50 centipoise) to about 100 kilopascal-seconds (100,000,000 centipoise), the viscosity being a function of the $R^2$ radicals on this polymer. The preferred viscosity of component (B) depends on the specific properties desired in the silicone pressure sensitive adhesive. System I and II silicone pressure sensitive adhesives utilize a gum based polydiorganosiloxane, component (B), having a viscosity in the range of 300,000 to 10,000,000 centipoise when measured at 25° C. System III silicone pressure sensitive adhesives utilize a fluid based polydiorganosiloxane, component (B), having a viscosity in the range of about 800 to 300,000 centipoise, preferably 10,000 to 100,000 centipoise when measured at 25° C. System IV PSAs employ a component (B) having a viscosity of about 50 to 800 cP, preferably 200 to 500, when measured at 25° C.

Examples of polydiorganosiloxanes which are suitable for use as component (B) in the compositions of this invention include hydroxyl-terminated polydiorganosiloxanes, alkenyl-terminated polydiorganosiloxanes, and polydiorganosiloxanes terminated with hydrocarbon radicals free of olefinic unsaturation. Specific examples of these polydiorganosiloxane include, but are not limited to, $ViMe_2SiO(Me_2SiO)_nSiMe_2Vi$, $ViMe_2SiO(Me_2SiO)_{0.95\ n}(MePhSiO)_{0.05\ n}SiMe_2Vi$, $Me_3SiO(Me_2SiO)_nSiMe_3$, $HOMe_2SiO(Me_2SiO)_nSiMe_2OH$, $HOR^2_2SiO(Me_2SiO)_{0.94n}(Ph_2SiO)_{0.06\ n}SiR^2_2OH$, $HOR^2_2SiO(Me_2SiO)_{0.95\ n}(MeViSiO)_{0.05\ n}SiR^2_2OH$, $ViMe_2SiO(Me_2SiO)_{0.98\ n}(MeViSiO)_{0.02\ n}SiMe_2Vi$, $HOR^2_2SiO(Me_2SiO)_{0.88\ n}(Ph_2SiO)_{0.12\ n}SiR^2_2OH$, $Me_3SiO(Me_2SiO)_{0.95\ n}(MeViSiO)_{0.05\ n}SiMe_3$, $PhMeViSiO(Me_2SiO)_nSiPhMeVi$, $Me_3SiO(Me_2SiO)_{0.5\ n}(MePhSiO)_{0.5\ n}SiMe_3$, and $PhMeViSiO(Me_2SiO)_{0.8\ n}(MePhSiO)_{0.1\ n}(Ph_2SiO)_{0.1\ n}SiPhMeVi$, wherein Me, Vi and Ph denote methyl, vinyl and phenyl, respectively and both $R^2$ at a terminal portion are the same as those of at least one of the siloxane units present in the polydiorganosiloxane; and n has its previously defined meaning.

The optimum relative amounts of components (A) and (B) that are used to form silicone PSA compositions according to the present invention are best determined by routine experimentation since adhesive performance is at least a function of the molecular weights of resin (A) and polymer (B). Typically, the proportions are such that from about 60 to 90 parts by weight of component (A) is used for every 100 parts by weight of components (A)+(B). These amounts are non-volatile amounts, as determined with the non-volatile content test, noted below. The preferred amounts of components (A) and (B) depend on the type of silicone pressure sensitive adhesive. Preferably the System I silicone pressure sensitive adhesives contain approximately 80 parts by weight of component (A) for every 100 parts by weight of components (A)+(B). Preferably the System II silicone pressure sensitive adhesives contain approximately 75 parts by weight of component (A) for every 100 parts by weight of components (A)+(B). Preferably the System III silicone pressure sensitive adhesives contain approximately 72 parts by weight of component (A) for every 100 parts by weight of components (A)+(B). Preferably the System IV silicone pressure sensitive adhesives contain approximately 70 parts by weight of component (A) for every 100 parts by weight of components (A)+(B).

Although the PSAs of the present invention can be cured by heating to temperatures of up to about 300° C. for a suitable length of time, it is preferred that a crosslinking agent (C) is also included in the composition in order to obtain superior adhesive properties.

Crosslinking agent (C) of the present invention can be any reactive material that is effective to convert component (B) from its normally flowable state to a non-flowable state. Crosslinking agents which are reactive with the alkenyl radicals and/or hydroxyl radicals and/or alkyl radicals are recommended. Preferably the crosslinking agent is an organic peroxide or an organohydrogenpolysiloxane.

For Systems I to III of the present invention wherein the polymer component (B) does not contain unsaturated groups, an organic peroxide is typically used as the crosslinking agent. Organic peroxide crosslinking agents include benzoyl peroxide, dicumyl peroxide, 2,5-dimethyl-2,5-di(t-butylperoxy)hexane and dichlorobenzoyl peroxide. Benzoyl peroxide has been found to be a particularly effective organic peroxide crosslinking agent. The organic peroxide crosslinking agent is used at about 1 to 2 parts per 100 weight parts of components (A) and (B).

In general, for PSAs wherein the polymer component (B) contains olefinically unsaturated groups, the preferred crosslinking agent is an organohydrogenpolysiloxane. When component (B) contains an average of at least 3 olefinically unsaturated groups per molecule, this organohydrogenpolysiloxane crosslinker should have an average of at least 2 silicon-bonded hydrogen atoms in each molecule. When component (B) contains an average of at least 2 olefinically unsaturated groups per molecule, this organohydrogenpolysiloxane crosslinker should have average of at least 3 silicon-bonded hydrogen atoms in each molecule. Preferably, this type of crosslinker has at least 3 Si-bonded hydrogens per molecule. Alternatively, a vinyl-specific peroxide could be used as the crosslinking agent for System I to System III PSAs which employ a polymer containing such unsaturated groups.

Illustrative of the organohydrogenpolysiloxanes which are generally operative in the present invention are fluid organohydrogenpolysiloxanes such as polymethylhydrogensiloxanes; fluid siloxane copolymer resins comprised of $SiO_{4/2}$ units, $Me_3SiO_{\frac{1}{2}}$ units and units such as $Me_2HSiO_{\frac{1}{2}}$, $MeHSiO_{2/2}$ and $Me_2SiO_{2/2}$, etc.; and mixtures thereof. A preferred organohydrogenpolysiloxane crosslinking agent is a linear methylhydrogenpolysiloxane comprised of methylhydrogensiloxane units and, optionally, dimethylsiloxane units. When an alkenyl-functional siloxane (B) is employed, the organohydrogenpolysiloxane crosslinking agent is added in an amount sufficient to provide from 1 to 200 silicon-bonded hydrogen atoms per alkenyl radical in the composition. The preferred ratio depends on the type of composition. For example, 30 to 60 in Systems I and II PSAs and 10 to 30 in System III PSAs are the respective preferred ranges of silicon-bonded hydrogen atom content per alkenyl radical.

System IV PSAs of the invention use a polymer component (B) which contains at least two olefinically unsaturated groups in each molecule and these adhesives are cured with the above described organohydrogenpolysiloxane crosslinking agents. In this case, the crosslinker agent (C) must be compatible with, and preferably soluble in, the mixture of (A) and (B). By "compatible," it is meant that the required amount of the organohydrogenpolysiloxane is at least partially soluble in the mixture of (A) and (B) and will exist in a uniformly dispersed state in the compositions of this invention while participating in the curing reaction, until the cure has been effected. In these System IV PSAs, polymethylhydrogensiloxanes having a degree of polymerization of less than 80 are preferably employed as the crosslinking agent. More preferably, the polymethylhydrogensiloxanes have a degree of polymerization of less than 10. This crosslinking agent is added in a sufficient amount to provide from 1 to 30 silicon bonded hydrogen atoms for every olefinically unsaturated radical in the total of (A) plus (B). Preferably, there are from 1 to 10 silicone-bonded hydrogen atoms for every olefinically unsaturated radical.

When an organohydrogenpolysiloxane crosslinking agent is used, it is recommended that the compositions additionally include a platinum group metal-containing catalyst, described infra. Such platinum group metal-containing catalysts accelerate the reaction of component (B) with the crosslinking agent and permit room temperature or low temperature curing of the composition. The platinum group metal-containing catalyst is added in an amount sufficient to provide 0.1 to 1,000, preferably 1 to 500 and most preferably 10 to 300, parts by weight of platinum for each one million weight parts of the composition.

When a platinum group metal-containing catalyst is used, it is recommended that the compositions additionally include a platinum catalyst inhibitor. The platinum catalyst inhibitor can be any platinum-catalyst inhibitor that is known in the art. Preferred platinum catalyst inhibitors include various "ene-yne" systems, such as 3-methyl-3-pentene-1-yne and 3,5-dimethyl-3-hexene-1-yne; acetylenic alcohols, such as 3-methyl-1-butyne-3-ol, 3,5-dimethyl-1-hexyne-3-ol, 3-methyl-1-pentyne-3-ol, and phenylbutynol; maleates and fumarates, such as the well-known dialkyl, dialkenyl and dialkoxyalkyl fumarates and maleates; cyclovinylsiloxanes; and benzyl alcohol. The platinum catalyst inhibitor can be used in any amount that will retard the abovedescribed catalyzed addition reaction at room temperature while not preventing said reaction at elevated temperature; the proportion of this ingredient to be used may be readily determined by routine experimentation.

Curing of the compositions of this invention can be accomplished by heating at temperatures of up to 300° C., preferably at 80° to 200° C., for a suitable length of time. The compositions may also be cured by ultraviolet light or electron beam radiation. Ultraviolet light may be used to cure the compositions if one or more crosslinking agents is added prior to curing. Suitable sources of UV radiation include a Hanovia 550-watt lamp or a PPG Processor Model QC1202, inter alia.

If ultraviolet light is used, the composition should contain a free-radical initiator or a precious metal-containing catalyst. The latter catalysts include all of the well known platinum and rhodium catalysts which are effective for catalyzing the reaction of silicon-bonded hydrogen atoms with silicon-bonded alkenyl radicals or hydroxyl radicals. In addition, complexes of the metals ruthenium, palladium, osmium and irridium can be utilized. A preferred platinum-containing catalyst is a chloroplatinic acid-vinylsiloxane complex disclosed by Willing in U.S. Pat. No. 3,419,593, hereby incorporated by reference. Preferred rhodium catalysts are disclosed by Eckberg in U.S. Pat. No. 4,347,346, which is also incorporated herein by reference. The amount of precious metal or precious metal-containing catalyst is not critical so long as proper crosslinking is achieved.

Alternatively, the composition may be cured using electron beam radiation. Electron beam sources of various types such as van de Graaff-type, resonance transformer-type, linear-type, dynatron-type, and high frequency-type can be used. Electron beam radiation having energy of from 50 to 1000 KeV, preferably from 100 to 300 KeV discharged therefrom, may be employed in a dose of from 0.1 to 10.0 Mega Rads (MR). A particularly preferred source of electron beam radiation is one wherein a continuous curtain-like beam emanates from a linear filament. Examples of commercially available sources of electron beam are Electro Curtain CB-150 available from Energy Sciences Inc., and NP-ESH 150 available from Otto Durr.

The System I to III compositions of this invention are made by homogeneously mixing 60 to 90 parts by weight of component (A) and 10 to 40 parts by weight of component (B) in the presence of a non-reactive solvent. Solvents useful in the present invention include hydrocarbons, such as toluene, xylene, heptane, and mineral spirits; volatile siloxanes, such as octamethylcyclotetrasiloxane and hexamethyldisiloxane; halohydrocarbons, alcohols, esters, ketones and combinations of these solvents. The amount of solvent required depends on the viscosity of the polydiorganosiloxane, component (B). Higher viscosity polydiorganosiloxane polymers require more solvent than lower viscosity polydiorganosiloxane polymers to facilitate the preparation, handling and applying of the compositions. Suitable mixing means include a spatula, a drum roller, a mechanical stirrer, a three-roll mill, a sigma blade mixer, a bread dough mixer, and a two-roll mill. Preferably, component (C) is added to the above mixture just before the product is to be used in the case of peroxide crosslinking agent, but may be mixed with (A) and (B) in the case of organohydrogenpolysiloxane crosslinking agent. When the crosslinking agent is an organohydrogenpolysiloxane, the platinum catalyst inhibitor can also be mixed in with components (A), (B) and (C) and the platinum group metal-containing catalyst is preferably added last, or just prior to use.

System IV PSA compositions of the present invention may also be prepared by mixing the components in a solvent. Typically, component (A) is dissolved in about 5 to 15 weight percent of an organic solvent to facilitate mixing and the component (B) is then added. When the viscosity of component (B) is low enough, mixing can be accomplished without the aid of a solvent (i.e., an essentially 100% solids PSA composition is also contemplated herein). To obtain a solventless composition of the present invention, the mixture of components (A), (B) and solvent should be devolatilized under conditions equivalent to vacuum stripping at 130° C. and 1-2 millimeters of mercury in a batch operation. The removal of solvent can also be accomplished by any of the known techniques such as contact with a stream of inert gas, evaporation, distillation, thin film stripping, and the like. Excessively high temperatures should be avoided when components (A) and (B) or their mixtures are being devolatilized. A temperature of 200° C. and preferably 150° C. should not be exceeded. The crosslinking agent and any appropriate catalyst are then added to the devolatilized mixture of (A) and (B) to complete the composition.

In general, small amounts of additional ingredients may be added to the compositions of this invention. For example, antioxidants, pigments, stabilizers, fillers, etc., may be added as long as they do not materially reduce the pressure sensitive adhesive properties of these compositions.

The silicone PSA compositions of this invention are useful as pressure sensitive adhesives and will readily stick to a solid support, whether flexible or rigid. These compositions may be applied to a surface by any suitable means such as rolling, spreading, spraying, etc., and cured as described above.

The surface of the support and the substrate to which the support is adhered may be any known solid material such as metals, such as aluminum, silver, copper, iron and their alloys; porous materials such as paper, wood, leather, and fabrics; organic polymeric materials such as polyolefins, such as polyethylene and polypropylene; fluorocarbon polymers such as polytetrafluoroethylene and polyvinylfluoride; silicone elastomers; silicone resins; polystyrene; polyamides such as Nylon; polyesters and acrylic polymers; painted surfaces; siliceous materials such as concrete, bricks, cinderblocks, and glass such as glass cloth, etc. Porous materials such as glass cloth are often impregnated with a substance that will prevent the migration of the silicone pressure sensitive adhesive from one surface to another surface of the support. In this regard, it is also well known to chemically treat the surface of a flourocarbon polymer support to enhance the adhesion of the silicone pressure sensitive adhesive to said surface. As noted previously, the PSAs of the invention are particularly suited to applications wherein good adhesion to a low energy surface (e.g., polyethylene or Teflon TM) is desired.

Useful articles which can be prepared with the silicone pressure sensitive adhesives of this invention include pressure sensitive tapes, labels, emblems and other decorative or informational signs, among others. An especially useful article is one comprising a flexible or rigid support that can withstand extreme temperatures, hot and/or cold, and carrying on at least one surface thereof the silicone pressure sensitive adhesives of this invention. Such an article makes full use of the stability at high temperatures and the flexibility at low temperatures that the silicone pressure sensitive adhesives of this invention possess.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

The apparatus and testing procedures used for the results shown herein are as follows:

Measurement of Viscosity, Non-volatile Content and MW

Viscosities were measured in centipoise at room temperature (25°+/−2° C.) using a Brookfield rotating disc viscometer fitted with an LV-4 spindle.

Non-volatile content, i.e. percent solids, of a material was determined by heating a two gram sample of the material to 150° C. for one hour and expressing the weight of the residue as a percentage of the original sample weight.

Molecular weights of the soluble organopolysiloxanes were measured by gel-permeation chromatography (GPC) using Varian TSK 4000+2500 columns at 35° C., a chloroform mobile phase at 1 mL/min. Polystyrene (PS) or resin standards were used for linear regression calibrations, the $M_n$ obtained using each standard being convertible to the other standard, as described supra. A refractive index detector was used in the GPC measurements employing the PS standard calibration and an IR detector set at 9.1 microns to detect Si-O-Si was used in the measurements employing resin standards. When summation end points were selected so as to exclude the neopentamer portion (Me$_3$SiO)$_4$Si of the chromatogram from the molecular weight calculations, the molecular weights are designated by the symbols $M_n$, $M_z$, $M_w$ and peak $M_y$. When summation end points were selected so as to include the entire chromatogram in the molecular weight calculations, the molecular weights are designated by the symbols $M'_n$, $M'_z$, $M'_w$ and peak $M'_y$. When molecular weights were obtained using the resin standard calibrations, the corresponding PS standard values were also calculated in the manner described supra.

Measurement of Adhesion, Tack Hold Time and Tensile Modulus

Adhesion was measured by applying a 6×1 inch strip of a Kaptor ™ - or Mylar ™ -backed adhesive to a clean 2×6 inch stainless steel, polyethylene (PE) or Teflon ™ panel using two passes of a 2 kg rubber-coated roller. The force required to remove the tape from the panel was measured with a Keil Tester at an peel angle of 180° at a rate of 12 inches per minute. The values recorded are the average of multiple readings taken during the course of one pull per sample. The Keil Tester is described in TAPPI, vol. 43, No. 8, pages 164A and 165A (August 1960). The readings are reported in units of ounces per inch (oz/in).

Tack was measured on five one-inch squares of the Kapton ™ or Mylar ™ -backed adhesive using a POLYKEN ® probe tack tester, available from Testing Machines, Inc., Amityville, NY. The tack tester has a 0.5 cm diameter stainless steel probe. The test procedure used a 20 gram weight, a dwell time of 0.5 seconds and a pull speed of 0.5 cm per second. The results reported represent the average of the five readings, expressed in grams.

Finger Tack was a subjective measurement of the stickiness of the adhesive. Finger Tack was determined by an operator who contacted a finger with the adhesive momentarily and rated the adhesive based on stickiness. The following ratings were used: HIGH, AVERAGE, LOW and NONE.

Hold Time was measured by placing 4×½ inch strips of Kapton ™ -backed adhesive or Mylar ™ -backed adhesive onto a clean stainless steel plate so as to provide a 1×½ inch area of contact and secured with two passes of a 2 kg rubber-coated roller. A 500 gram weight was hung from the free end of each strip. The time at a given temperature required to cause the strips to separate from the steel plate was measured. If a data table cites only a temperature or a pass/fail designation that sample passed a five day hold at that temperature.

Tensile Modulus and Breaking Stress were measured by removing a sample of a cured silicone pressure sensitive adhesive from a fluorosilicone release liner and testing it with an Instron tester. The stress in pounds per square inch (psi) at 1000 percent extension, and at the breaking point, was determined using a standard stress/strain test method.

Organopolysiloxanes (A) used in the Examples

The following resins of the examples were analyzed using $^{29}$Si n.m.r. and the mole percentages of the (CH$_3$)$_3$SiO$_{\frac{1}{2}}$units (M) and SiO$_{4/2}$ units (Q) for the resinous (res) and neopentamer (neo) portions was determined; from these, the ratio of total M/Q was calculated, as described supra.

Resin A = a xylene solution of a resin consisting of (CH$_3$)$_3$SiO$_{\frac{1}{2}}$units and SiO$_{4/2}$ units and having $M_n=1,963$, $M_n=5.040$, $M_n=15,170$, $M_n=2.57$ and a hydroxyl content of 3.45%. $M_n=920$, $M_n=4,259$, $M_n=14,732$ and $M'_w/M'_n=4.63$ (GPC data obtained using PS standards). M(res)=36.0; M(neo)=2.2; Q(res)=46.8; and Q(neo)=0.6. M/Q=0.8.

Resin B = a xylene solution of a resin consisting of (CH$_3$)$_3$SiO$_{\frac{1}{2}}$units and SiO$_{4/2}$ units and having $M_n=1,535$, $M_w=3,778$, $M_n=12,810$, $M_w/M_n=2.46$ and a hydroxyl content of 2.63% (GPC data obtained using PS standards). M(res)=36.4; M(neo)=10.6; Q(res)=40.3; and Q(neo)=2.7. M/Q=1.1.

Resin C = a xylene solution of a resin consisting of (CH$_3$)$_3$SiO$_{\frac{1}{2}}$units and SiO$_{4/2}$ units and having $M_n=1,304$, $M_w=2,353$, $M_z=6,562$, $M_w/M_n=1.80$ and a hydroxyl content of 2.11%, $M'_n=568$, $M'_w=1,560$, $M'_z=3,768$ and $M'_w/M'_n=2.75$ (GPC data obtained using PS standards). M(res)=43.2; M(neo)=4.5; Q(res)=42.2; and Q(neo)=1.1. M/Q=1.1.

Resin D = a xylene solution of a resin consisting of (CH$_3$)$_3$SiO$_{\frac{1}{2}}$units and SiO$_{4/2}$ units and having $M_n=1,066$, $M_w=1,593$, $M_z=2,848$, $M_w/M_n=1.49$ and a hydroxyl content of 2.12%. $M'_n=590$, $M'_w=1,273$, $M'_z=2,615$ and $M'_w/M'_n=2.16$ (GPC data obtained using PS standards). M(res)=46.1; M(neo)=7.3; Q(res)=37.9; and Q(neo)=1.7. M/Q=1.3.

Resin E = a xylene solution of a resin prepared by reacting Resin C with hexamethyldisilazane in the presence of trifluoroacetic acid to reduce its silicon-bonded hydroxyl content to less than 0.5 percent.

Resin F = a xylene solution of a resin prepared by reacting Resin C with 1,3-bis(3,3,3-trifluoropropyl)tetramethyldisilazane in the presence of trifluoroacetic acid to reduce its silicon-bonded hydroxyl content to less than 1.0 percent.

Resin G = a resin prepared by removing the xylene solvent from Resin E and replacing it with hexamethyldisiloxane at a solids content of 80 percent.

Resin H = a 69% toluene solution of a resin prepared from an acid-catalyzed hydrolysis/condensation of tetraethoxysilane and consisting of (CH$_3$)$_3$SiO$_{\frac{1}{2}}$units and SiO$_{4/2}$ units having $M_n=1,385$, $M_w=1,906$, $M_z=2,860$, $M_w/M_n=1.38$ (GPC data obtained using Resin standards). The corresponding $M_n$ based on PS standards was calculated as 766. M(res) =54.9; Q(res)=36.9 (no neopentamer produced by this process). M/Q=1.5.

Resin I = a 62% xylene solution of a resin prepared from sodium silicate according to the methods of Daudt et al., cited supra, and consisting of (CH$_3$)$_3$SiO$_{\frac{1}{2}}$units and SiO$_{4/2}$ units and having $M_n=1,919$, $M_w=2,833$, $M_z=4,477$, $M_w/M_n=1.48$ (GPC data obtained using Resin standards). The corresponding $M_n$ based on PS standards was calculated as 958. M(res)=41.9; M(neo)=9.2; Q(res)=34.3; and Q(neo)=2.0. M/Q=1.4.

Resin J = a 70% xylene solution of a resin prepared from sodium silicate according to the methods of Daudt et al. and consisting of (CH$_3$)$_3$SiO$_{\frac{1}{2}}$units and SiO$_{4/2}$ units and having $M_n=2,136$, $M_w=3,396$, $M_z=5,801$, $M_w/M_n=1.59$ (GPC data obtained using Resin standards). The corresponding $M_n$ based on PS standards was calculated as 1,037. M(res)=43.5; M(neo)=6.4; Q(res)=35.2; and Q(neo)=1.7. M/Q=1.4.

Resin K=an 80% xylene solution of a resin prepared from sodium silicate according to the methods of Daudt et al. and consisting of $(CH_3)_3SiO_{\frac{1}{2}}$ units and $SiO_{4/2}$ units and having $M_n=2,562$, $M_w=4,719$, $M_z=9,261$, $M_w/M_n=1.59$ (GPC data obtained using Resin standards). The corresponding $M_n$ based on PS standards was calculated as 1.191. M(res)=44.6; M(neo)=5.0; Q(res)=38.0; and Q(neo)=1.4. M/Q=1.3.

Resin L=an 82.5% xylene solution of a resin prepared from potassium silicate according to the methods of Daudt et al. and consisting of $(CH_3)_3SiO_{\frac{1}{2}}$ units and $SiO_{4/2}$ units and having $M_n=3,788$, $M_w=12,020$, $M_z=38,530$, $M_w/M_n=3.17$ and a hydroxyl content of 2.74% (GPC data obtained using Resin standards). The corresponding $M_n$ based on PS standards was calculated as 1,633. M(res)=40.0; M(neo)=5.2; Q(res)=39.9; and Q(neo)=1.4. M/Q=1.1.

Resin M=a 73.5% xylene solution of a resin prepared from sodium silicate according to the methods of Daudt et al. and consisting of $(CH_3)_3SiO_{\frac{1}{2}}$ units and $SiO_{4/2}$ units and having $M_n=4,339$, $M_w=16,140$, $M_z=59,620$, $M_w/M_n=3.72$ and a hydroxyl content of 2.54% (GPC data obtained using Resin standards). The corresponding $M_n$ based on PS standards was calculated as 1,832. M(res)=39.3; M(neo)=4.1; Q(res)=41.4; and Q(neo)=1.3. M/Q=1.0.

Resin N=a 71% xylene solution of a resin prepared from sodium silicate according to the methods of Daudt et al. and consisting of $(CH_3)_3SiO_{\frac{1}{2}}$ units and $SiO_{4/2}$ units and having $M_n=4,364$, $M_w=15,840$, $M_z=54,640$, $M_w/M_n=3.63$ and a hydroxyl content of 2.55% (GPC data obtained using Resin standards). The corresponding $M_n$ based on PS standards was calculated as 1,841. M(res)=41.6; M(neo)=2.3; Q(res)=42.8; and Q(neo)=0.8. M/Q=1.0.

Resin N-1=a 75% xylene solution of a resin prepared by fractionating Resin N, this fraction consisting of $(CH_3)_3SiO_{\frac{1}{2}}$ units and $SiO_{4/2}$ units and having $M_n=3,317$, $M_w=5,138$, $M_z=8,578$, $M_w/M_n=1.55$ (GPC data obtained using Resin standards). The corresponding $M_n$ based on PS standards was calculated as 1,463. M(res)=44.3; Q(res)=44.3; M/Q=1.0.

Resin O=a 78% xylene solution of a resin prepared from potassium silicate according to the methods of Daudt et al. and consisting of $(CH_3)_3SiO_{\frac{1}{2}}$ units and $SiO_{4/2}$ units and having $M_n=5,697$, $M_w=25,400$, $M_z=88,550$, $M_w/M_n=4.46$ and a hydroxyl content of 2.56% (GPC data obtained using Resin standards). The corresponding $M_n$ based on PS standards was calculated as 2,322. M(res)=39.3; M(neo)=4.1; Q(res)=41.7; and Q(neo)=1.1. M/Q=1.0.

Resin P=90% xylene solution of a resin consisting of $(CH_3)_3SiO_{\frac{1}{2}}$ units and $SiO_{4/2}$ units and in a mole ratio of 1.1/1.0 with Mn=2,708, Mw/Mn=1.7 and the silanol content is less than 0.5 weight percent (GPC data obtained using resin standards). The corresponding $M_n$ based on PS standards was calculated as 1,243.

Resin Q=a 73% xylene solution of a resin consisting of $(CH_3)_3SiO_{\frac{1}{2}}$ units and $SiO_{4/2}$ units and in a mole ratio of 1.3/1.0 with Mn=2,251, Mw/Mn=2.05 and the silanol content is less than 0.5 weight percent (GPC data obtained using resin standards). The corresponding $M_n$ based on PS standards was calculated as 1,078.

Polyorganosiloxane (B) used in the Examples

Polymers A-F, J and K are silicone gums having a plasticity number of 140-165, as measured by ASTM 926-67, and viscosities of at least 10,000,000 centipoise measured at 25° C.

Polymer A=a 7.5/1 blend of a dimethylpolysiloxane having dimethylvinylsiloxy endgroups and a vinyl content of 0.02 mole percent and a dimethyl-co-methylvinylpolysiloxane having dimethylvinylsiloxy endgroups and a vinyl (Vi) content of 2.0 mole percent.

Polymer B=a dimethyl-co-methylvinylpolysiloxane having dimethylvinylsiloxy endgroups and a methylvinylsiloxy content of 0.11 mole percent.

Polymer C=a dimethyl-co-phenylmethyl-comethylvinylpolysiloxane having dimethylvinylsiloxy endgroups, a methylvinylsiloxy content of 0.14 mole percent and a phenylmethylsiloxy content of 7.5 mole percent.

Polymer D=a dimethylvinyl-terminated dimethylcodiphenylpolysiloxane having diphenylsiloxy content of 10 mole percent.

Polymer E=a dimethyl-co-methylvinylpolysiloxane having dimethylvinylsiloxy endgroups and a vinyl content of 0.14 mole percent.

Polymer F=a dimethylpolysiloxane having dimethylvinylsiloxy endgroups and a vinyl content of 0.02 mole percent.

Polymer G=a dimethylpolysiloxane having dimethylvinylsiloxy endgroups and a viscosity of 63,000 centipoise measured at 25° C.

Polymer H=a dimethylpolysiloxane having dimethylvinylsiloxy endgroups and a viscosity of 10,000 centipoise measured at 25° C.

Polymer I=a dimethylpolysiloxane having dimethylvinylsiloxy endgroups and a viscosity of 500 centipoise measured at 25° C.

Polymer J=a dimethylpolysiloxane having hydroxyl endgroups.

Polymer K=a dimethylpolysiloxane having dimethylvinylsiloxy endgroups.

Polymer L=a polydimethylsiloxane of the formula

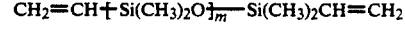

$CH_2=CH+Si(CH_3)_2O+_{\overline{m}}Si(CH_3)_2CH=CH_2$ wherein m is a number having an average value of 150. Polymer L has a viscosity of 450 centipoise measured at 25° C.

Polymer M=a polydimethylsiloxane of the formula

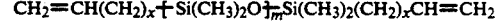

$CH_2=CH(CH_2)_x+Si(CH_3)_2O+_{\overline{m}}Si(CH_3)_2(CH_2)_xCH=CH_2$ wherein m is a number having an average value of 100 and x is a number having an average value of 4. Polymer M has a viscosity of 300 centipoise measured at 25° C.

Crosslinking Agents used in the Examples

Crosslinking Agent A=a trimethylsiloxy terminated dimethyl-co-methylhydrogenpolysiloxane having a methylhydrogensiloxy content of 70 mole percent and an average degree of polymerization of 40.

Crosslinking Agent B=a trimethylsiloxy-terminated methylhydrogen-co-dimethylpolysiloxane having a viscosity of about 20 centipoise and containing 1.03% silicon-bonded hydrogen atoms.

Crosslinking Agent C = a dimethylhydrogensiloxy terminated dimethylpolysiloxane with an average degree of polymerization of 15.

Crosslinking Agent D = a soluble organopolysiloxane consisting of $(CH_3)_3SiO_{\frac{1}{2}}$ units, $(CH_3)_2HSiO_{\frac{1}{2}}$ and $SiO_{4/2}$ units in a mole ratio of 0.6/0.9/1.0.

Crosslinking Agent E = a soluble organopolysiloxane consisting of $(CH_3)_3SiO_{\frac{1}{2}}$ units, $(CH_3)_2HSiO_{\frac{1}{2}}$ units and $SiO_{4/2}$ units in a mole ratio of 1.2/1.8/1.0.

Crosslinking Agent F = a trimethylsiloxy terminated methylhydrogenpolysiloxane having an average degree of polymerization of 40.

Crosslinking Agent G = a trimethylsiloxy terminated dimethyl-co-methylhydryogenpolysiloxane having a methylhydrogensiloxy content of 9 mole percent and an average degree of polymerization of 100.

Crosslinking Agent H = a trimethylsiloxy terminated dimethyl-co-methylhydrogenpolysiloxane having a methylhydrogensiloxy content of 27 mole percent and an average degree of polymerization of 15.

Crosslinking Agent I = a trimethylsiloxy terminated methylhydrogenpolysiloxane having an average degree of polymerization of 5.

Crosslinking Agent J = a trimethylsiloxy terminated methylhydrogenpolysiloxane having an average degree of polymerization of 10.

Crosslinking Agent K = a trimethylsiloxy terminated methylhydrogenpolysiloxane having an average degree of polymerization of 20.

EXAMPLE 1

Mixtures of Resin D (67% in xylene) and Polymer A, in ratios ranging from 43-87 parts of Resin D to 57-13 parts of Polymer A, a trimethylsiloxy-terminated polymethylhydrogensiloxane crosslinking agent (Crosslinking Agent F) (SiH/Vi molar ratio = 3/1), toluene (50% based on the total weight), a vinylsiloxane complex of chloroplatinic acid (0.4% based on total weight), and 3 5-dimethyl-1-hexyne-3-ene, were prepared. The compositions were applied to the surface of a 2 mil Mylar ™ backing by means of 3 mil Bird bar. The compositions were cured in a laboratory convection oven at 130° C. for four minutes. The test results are summarized in Table I. The different ratios and the results associated with such ratios of Resin D to Polymer A are provided by letters A through I.

EXAMPLE 2

Compositions identical to those of Example 1 were prepared, except Resin C (78% in xylene) was substituted for Resin D. The test results are summarized in Table I.

EXAMPLE 3

Compositions identical to those of Example 1 were prepared, except Resin B (60% in xylene) was substituted for Resin D. The test results are summarized in Table I.

COMPARATIVE EXAMPLE 4

Compositions identical to those of Example 1 were prepared, except Resin A (68% in xylene) was substituted for Resin D. The test results are summarized in Table I.

TABLE I

| Example | Resin/Polymer Weight Ratio | Adhesion, oz/in* Steel | Adhesion, oz/in* PE | RT Hold, minutes Steel | Tack (gms) Average | Tack (gms) SD** |
|---|---|---|---|---|---|---|
| 1A | 43/57 | 0a | 0a | — | 143 | 2 |
| 1B | 50/50 | 0a | 0.5a | — | 185 | 4 |
| 1C | 56/44 | 0.5a | 1a | — | 209 | 16 |
| 1D | 62/38 | 1.5a | 1.5a | — | 201 | 24 |
| 1E | 67/33 | 10c | 8a | — | 414 | 32 |
| 1F | 72/28 | 12c | 15c | — | 383 | 20 |
| 1G | 77/23 | 20c | 22c | — | 420 | 19 |
| 1H | 82/18 | 26c | 25c | — | 562 | 11 |
| 1I | 87/13 | 32c | 28c | — | 731 | 22 |
| 2A | 43/57 | 0a | 0a | 1, 0 | 189 | 19 |
| 2B | 50/50 | 0a | 0a | 1, 1 | 295 | 24 |
| 2C | 56/44 | 2a | 3a | 4, 3 | 441 | 43 |
| 2D | 62/38 | 9a | 16a | 22, 22 | 849 | 29 |
| 2E | 67/33 | 30a | 25a | 78, 58 | 1253 | 31 |
| 2F | 72/28 | 52c | 40a | 49, 33 | 1047 | 82 |
| 2G | 77/23 | 70c | 53a | 140, 133 | 1397 | 143 |
| 2H | 80/20 | 76c | 71c | 317, 779 | 1837 | 169 |
| 2I | 82/18 | 64c | 33b | 606, 646 | 274 | 245 |
| 2J | 87/13 | 0a | 0a | 1830, 1838 | 0 | — |
| 3A | 43/57 | 1a | 14a | 1, 2 | 216 | 56 |
| 3B | 50/50 | 5a | 4a | 4, 4 | 404 | 49 |
| 3C | 56/44 | 18a | 16a | 18, 86 | 612 | 82 |
| 3D | 62/38 | 42a | 22a | 89, 133 | 849 | 166 |
| 3E | 67/33 | 58c | 40a | 57, 111 | 1245 | 223 |
| 3F | 72/28 | 72a | 12a | 2949, >3000 | 1729 | 133 |
| 3G | 77/23 | >76c | 1a | >3000, >3000 | 277 | 195 |
| 3H | 80/20 | 1c | 0a | >3000, >3000 | 0 | 0 |
| 3I | 82/18 | 0 | 0 | 0, 0 | 0 | 0 |
| 4A | 43/57 | 14a | 3a | 26, 50 | 631 | 20 |
| 4B | 50/50 | 43a | 7a | >3000, >3000 | 818 | 64 |
| 4C | 56/44 | 61a | 7a | >3000, >3000 | 870 | 235 |
| 4D | 62/38 | 67a | 1a | >3000, >3000 | 277 | 108 |
| 4E | 67/33 | 1c | 0a | >3000, >3000 | 49 | 23 |
| 4F | 72/28 | 8a | 0a | >3000, >3000 | 0 | — |
| 4G | 77/23 | 0 | 0 | 0 — | 0 | — |
| 4H | 82/18 | 0 | 0 | 0 — | 0 | — |

-continued

| Example | Resin/Polymer Weight Ratio | Adhesion, oz/in* | | RT Hold, minutes | Tack (gms) | |
|---|---|---|---|---|---|---|
| | | Steel | PE | Steel | Average | SD** |
| 4I | 87/13 | 0 | 0 | 0 — | 0 | — |

*a = adhesive failure, c = cohesive failure, b = a & c.
**Standard Deviation.

Mixtures of Resin D (67% in xylene) and Polymer J. in ratios ranging from 43–87 parts of Resin D to 57–13 parts of Polymer A, benzoyl peroxide (2% based on silicone solids) and toluene (50% of total mixture) were prepared. The compositions were applied to the surface of a 2 mil Mylar TM backing by means of 3 mil Bird bar. The compositions were cured in a laboratory convection oven for one minute at 70° C. and for two minutes at 178° C. The test results are summarized in Table II. The different ratios and the results associated with such ratios of Resin D to Polymer A are provided by letters A through I.

EXAMPLE 6

Compositions identical to those of Example 5 were prepared, except Resin C (78% in xylene) was substituted for Resin D. The test results are summarized in Table II.

Compositions identical to those of Example 5 were prepared, except Resin B (60% in xylene) was substituted for Resin D. The test results are summarized in Table II.

COMPARATIVE EXAMPLE 8

Compositions identical to those of Example 5 were prepared, except Resin A (68% in xylene) was substituted for Resin D. The test results are summarized in Table II.

TABLE II

| Example | Resin/Polymer Weight Ratio | Adhesion, oz/in* | | RT Hold, minutes | Tack (gms) | |
|---|---|---|---|---|---|---|
| | | Steel | PE | Steel | Average | SD** |
| 5A | 43/57 | 1a | 2a | — | 245 | 17 |
| 5B | 50/50 | 2.5a | 3.5a | — | 289 | 19 |
| 5C | 56/44 | 8a | 6a | — | 252 | 19 |
| 5 | 62/38 | 10a | 12a | — | 231 | 14 |
| 5E | 67/33 | 22c | 12c | — | 216 | 16 |
| 5F | 72/28 | 20c | 14c | — | 224 | 45 |
| 5G | 77/23 | 24c | 18c | — | 309 | 22 |
| 5H | 82/18 | 21c | 20c | — | 432 | 26 |
| 5I | 87/13 | 28c | 30c | — | 658 | 18 |
| 6A | 43/57 | 8a | 10a | 1, 1 | 310 | 11 |
| 6B | 50/50 | 9a | 11a | 1, 3 | 338 | 13 |
| 6C | 56/44 | 27c | 30c | 4, 7 | 268 | 28 |
| 6D | 62/38 | 36b | 34c | 6, 27 | 186 | 19 |
| 6E | 67/33 | 43c | 40b | 12, 35 | 429 | 86 |
| 6F | 72/28 | 48c | 44c | 0, 1 | 703 | 40 |
| 6G | 77/23 | 63c | 54c | 8, 16 | 1104 | 313 |
| 6H | 80/20 | 64c | 24b | 46, 68 | 926 | 251 |
| 6I | 82/18 | 36c | .5a | 126, 160 | 581 | 148 |
| 6J | 87/13 | 0a | 0- | 1927, 2617 | 0 | — |
| 7A | 43/57 | 9a | 10a | — | 353 | 79 |
| 7B | 50/50 | 20a | 17a | — | 344 | 78 |
| 7C | 56/44 | 28a | 23a | — | 505 | 98 |
| 7D | 62/38 | 46a | 30a | — | 688 | 200 |
| 7E | 67/33 | 68a | 36a | — | 1108 | 261 |
| 7F | 72/28 | 76c | 16a | — | 1550 | 177 |
| 7G | 77/23 | 8c | 0a | — | 0 | — |
| 7H | 80/20 | 0a | 0a | — | 0 | — |
| 7I | 82/18 | 0 | 0 | — | 0 | — |
| 8A | 43/57 | 21a | 7a | — | 825 | 39 |
| 8B | 50/50 | 26a | 6a | — | 1056 | 107 |
| 8C | 56/44 | 43a | 2a | — | 1204 | 162 |
| 8D | 62/38 | 64a | 0.5a | — | 200 | 81 |
| 8E | 67/33 | 20a | 0a | — | 0 | — |
| 8F | 72/28 | 2a | 0a | — | 0 | — |
| 8G | 77/23 | 0 | 0 | — | 0 | — |
| 8H | 82/18 | 0 | 0 | — | 0 | — |
| 8I | 87/13 | 0 | 0 | — | 0 | — |

*a = adhesive failure, c = cohesive failure, b = a & c.
**Standard Deviation.

Tables I and II illustrate and improved adhesion of the instant PSAs to a low energy substrate (polyethylene).

EXAMPLES 9–12

Resin C (78% in xylene) was mixed with Polymer A in a resin/polymer ratio of 81/19 and various amounts of Crosslinking Agent B were added to portions thereof, along with a catalytic amount of a vinylsiloxane complex of chloroplatinic acid and a stabilizing amount of the catalyst inhibitor 3,5-dimethyl-1-hexyne-3-ene were added. The resulting compositions were cast onto 1-mil Kapton TM and cured at 130° C. for 4 minutes. A 1.5 to 2.0 mil cured adhesive film was formed. The adhesion and tack of the resulting silicone pressure sensitive adhesives is disclosed in Table III.

EXAMPLE 13

Example 11 was repeated except Polymer A was replaced with Polymer B. The resulting composition was cast and cured as described in Examples 9-12. The test results are disclosed in Table III.

TABLE III

| Example | Vinyl Mol % | SiH/Vinyl Mol Ratio | Adhesion, oz/in | | Tack (gms) |
|---|---|---|---|---|---|
| | | | Steel | PTFE | |
| 9 | 0.28 | 1.5 | 24 | 12 | 835 |
| 10 | 0.28 | 18.0 | 70 | 20 | 325 |
| 11 | 0.28 | 36.0 | 75 | 34 | 1095 |
| 12 | 0.28 | 60.0 | 70 | 20 | 830 |
| 13 | 0.11 | 38.0 | 75 | 30 | 1400 |

The results in Table III clearly show that different ranges of the polydiorganosiloxane polymer and silicone hydride crosslinker are acceptable in the preparation of silicone pressure sensitive adhesives that have high adhesion to PTFE (Teflon TM).

EXAMPLE 14

A silicone PSA was prepared using 82.7 parts of a resin having an $M_n=1,125$ (PS standard GPC). 17.3 parts of Polymer A, 2.45 parts of Crosslinking Agent B, 0.15 part of 3,5-dimethyl-1-hexyne-3-ene inhibitor and 75 parts of toluene. This adhesive was cured with 0.9% of a 50% toluene solution of a chloroplatinic acid-vinylsiloxane complex on a 1-mil Kapton TM backing at an adhesive thickness of 1.5 to 2.0 mils. Adhesion to stainless steel, polytetrafluoroethylene, polyethylene and low (38.6 dyne/cm) energy acrylic panels was determined, the results being presented in Table IV.

TABLE IV

| Adhesion (oz/in) | | | |
|---|---|---|---|
| PTFE | Acrylic | Steel | PE |
| 32 | 80 | 80 | 60 |

EXAMPLE 15

Eight grams (solids basis) of Resin C (71% in xylene) was mixed with 1.7 grams (solids basis) of Polymer C (25% in xylene) to provide a resin/polymer ratio of 82.5/17.5 and 240 microliters of the polymethylhydrogen-co-dimethylsiloxane used in Examples 9-12, was added, along with a catalytic amount (0.4% based on total composition) of a vinylsiloxane complex of chloroplatinic acid and a stabilizing amount of 3,5-dimethyl-1-hexyne-3-ene. The resulting composition was cast onto 1-mil Kapton TM and cured at 130° C. for 4 minutes forming a 1.5 to 2.0 mil adhesive film. The adhesion of the resulting PSA was 76 oz/in (steel) and 37 oz/in (polytetrafluoroethylene): tack was 1,484 g: and hold time at 70° C. was 120-180 minutes.

EXAMPLE 16

Four grams (solids basis) of Polymer D (25% in xylene) was mixed with 14.2 grams (solids basis) of Resin C (78% in xylene) to provide a resin/polymer ratio of 78/22, and 3.6 grams of a 10% solution of benzoyl peroxide in toluene was added. The resulting composition was cast onto 1-mil Kapton TM and cured at 70° C. for 1 minute and at 204° C. for 2 minutes. The adhesion and tack of the resulting adhesive was 78 oz/in (steel) and 30 oz/in (polytetrafluoroethylene). and the tack was 1578 grams.

The results in Examples 15 and 16 illustrate that polymers other than dimethylsiloxanes and methylvinylsiloxanes may be used in the compositions of the present invention.

EXAMPLES 17-19

Three compositions were prepared by mixing Resin E (80% in xylene) with various mixtures of Polymers E and F in a resin/polymer ratio of 74/26; a sufficient amount of Crosslinking Agent B to provide a SiH/SiVi molar ratio of 100/1; a sufficient amount of toluene to provide adhesive solutions containing 50 percent solids; a vinylsiloxane complex of chloroplatinic acid (0.4% based on total composition) and a platinum catalyst inhibitor. The compositions were cast as 1.5 mil films on 1-mil Kapton TM backing. The test results are summarized in Table V. Modulus at 1000% and breaking stress for the adhesive of Example 19 is recorded in Table VI.

EXAMPLE 20

This example was prepared and is identically described in Example 19, except Resin C (70% in xylene) was substituted for Resin E. The test results are summarized in Tables V and VI.

TABLE V

| Example | Polymer Ratio F/E | Resin/Polymer Weight Ratio | SiH/SiVi | Adhesion, oz/in. | | 5-day Hold (°F.) | Tack (gms) |
|---|---|---|---|---|---|---|---|
| | | | | Steel | PTFE | | |
| 17 | 5/0 | 74/26 | 100 | 37a | 20a | 500 | 1196 |
| 18 | 0/5 | 74/26 | 100 | 45a | 18a | 400 | 1150 |
| 19 | 1/4 | 74/26 | 100 | 69c | 25a | 400 | 1445 |
| 20 | 1/4 | 74/26 | 100 | 45a | 20a | <300** | 1055 |

*a = adhesive failure, b = adhesive and cohesive failure.
c = cohesive failure.
**Greater than 200.

EXAMPLES 21-23

Three compositions were prepared by mixing Resin E (80% in xylene) with Polymer E or Polymer F, or a mixture of Polymers E and F, in resin/polymer ratios of 72/28 and 75/25; a sufficient amount of the crosslinking agent used in Examples 17-19 to provide a SiH/SiVi ratio of from 48/1 to 100/1; a sufficient amount of toluene to provide adhesive solutions containing 50 percent solids; a vinylsiloxane complex of chloroplatinic acid (0.4% based on total composition) and a platinum catalyst inhibitor. The compositions were cast as 1.5 mil films on 1-mil Kapton TM backing. The test results are summarized in Table VII.

EXAMPLE 24

This example is similar to those described in Examples 21-23, except Resin C (78% in xylene) was substituted for Resin E. The test results are summarized in Tables VI and VII.

TABLE VI

| Example | 1000% Modulus (psi) | Stress at Break (psi) |
|---------|---------------------|----------------------|
| 19 | 84.5 | 175 |
| 25 | 88.9 | 107 |
| 20 | 35.4 | 62 |
| 24 | 6.6 | 48 |

TABLE VII

| Example | Polymer Ratio F/E | Resin/Polymer Weight Ratio | SiH/SiVi | Adhesion, oz/in* Steel | Adhesion, oz/in* PTFE | 5-day Hold (°F.) | Tack (gms) |
|---------|-------------------|----------------------------|----------|------------------------|-----------------------|------------------|------------|
| 21 | 5/0 | 75/25 | 72 | 46a | 19a | 400 | 1000 |
| 22 | 1/4.5 | 75/25 | 48 | 46a | 20a | 400 | 1052 |
| 23 | 0/5 | 72/28 | 100 | 44a | 20a | <300** | 990 |
| 24 | 1/4 | 80/20 | 100 | 68b | 28a | <200*** | 602 |

*a = adhesive failure. b = adhesive and cohesive failure. c = cohesive failure.
**Greater than 200.
***Greater than 150.

The results in Tables V and VII indicate that silicone pressure sensitive adhesives of System II show superior high temperature shear strength to those of System I.

EXAMPLE 25

A composition was prepared by mixing Resin F (70% in xylene) and a 1:4 mixture of Polymer F:Polymer E in a resin/polymer ratio of 74/26; a sufficient amount of a crosslinking agent of Example 17 to provide a SiH/SiVi molar ratio of 100/1; a sufficient amount of toluene to provide adhesive solutions containing 50 percent solids; a vinylsiloxane complex of chloroplatinic acid (0.4% based on total composition) and a platinum catalyst inhibitor. The peel adhesion on steel and polytetrafluoroethylene (PTFE), tack and 5-day hold temperature values for this composition, cast as 1.5 mil films on 1-mil Kapton TM backing, were 57 oz/in; 20 oz/in; 951 grams; and 400° F., respectively. A comparison of these values with those of Example 20 in Table V shows the greater shear strength of the composition of the example. Modulus at 1000% and breaking stress for the adhesive of Example 25 are recorded in Table VI, above.

EXAMPLES 26-39

Fourteen compositions of this invention were prepared by mixing appropriate amounts of Resin E, 80% in xylene, (except Example 28 which was prepared with Resin G) and Polymers G, H and/or I, to provide a resin/polymer ratio of 72/28, and a sufficient amount of the Crosslinking Agent A, to provide various molar amounts of silicon-bonded hydrogen for every silicon-bonded vinyl radical in Polymers G, H and/or I as noted in Table VIII.

The compositions of Examples 26-31 were prepared with Polymer G. The compositions of Examples 34-39 were prepared with Polymer H. The composition of Example 32 was prepared with a 90/10 mixture of Polymers G and H. The composition of Example 33 was prepared with a 97/3 mixture of Polymers G and I. The solvent content of some of the mixtures was reduced by evaporation at reduced pressure and/or elevated temperature, to provide the solids content noted in Table VIII.

A catalytic amount of a vinylsiloxane complex of chloroplatinic acid dissolved in Polymer I, a cure inhibiting amount of diethyl fumarate (DEF), and a bathlife extending amount of benzyl alcohol (BzOH) were added, as noted in Table IX, to the resulting compositions.

The catalyzed compositions were cast as 1.5 mil films on 1-mil Kapton TM backing and cured by one of three methods as follows.

Method 1 consisted of heating the coated film at 130° C. for 6 minutes for compositions having a SiH/SiVi molar ratio of 16 or less and at 130° C. for 4 minutes for compositions having a SiH/SiVi ratio of greater than 16.

Method 2 consisted of exposing the coated film 7 times, at a rate of 15 feet per minute, to a 1-foot opening of ultraviolet radiation from two mercury vapor lamps each having an output of 200 watts per inch and positioned 4 inches above the belt.

Method 3 consisted of Method 2 followed by Method 1.

The peel adhesion, tack, 5-day hold temperature, solids content and composition viscosity values for these compositions are listed in Table VIII.

EXAMPLES 40-41

Compositions identical to those of Example 26 were prepared, except Polymers K and B, respectively were substituted for Polymer G. The test results are summarized in Table VIII.

TABLE VIII

| Example | Cure | SiH/SiVi | Polymer Visc. | Adh* oz/in | Hold (°F.) | Tack (grams) | Solids (%) | Comp. Visc. |
|---------|------|----------|---------------|------------|------------|--------------|------------|-------------|
| 26 | — | — | 69M** | — | — | — | 92 | 63M |
| 27 | 2 | — | " | 77 | 400 | 881 | 94 | 100M |
| 28 | — | — | " | — | — | — | 92 | 120M |
| 29 | 3 | 25/1 | " | 48a | 450 | 1556 | 95 | 164M |
| 30 | 1 | 25/1 | " | 38a | — | 876 | — | — |
| 31 | 1 | 10/1 | " | 75a | <400 | 1549 | — | — |
| 32 | 2 | — | 60M | 64 | 400 | 1293 | 94 | 57M |
| 33 | 2 | — | " | 73 | 400 | 901 | 93 | 52M |
| 34 | — | — | 11M | — | — | — | 93 | 30M |
| 35 | 3 | 10/1 | " | 68ac | — | 1192 | — | — |
| 36 | 3 | 12/1 | " | 29a | 450 | 1100 | 95 | 51M |
| 37 | 3 | 25/1 | " | 44a | — | 1364 | — | — |
| 38 | 1 | 10/1 | " | 58a | — | 1283 | — | — |
| 39 | 1 | 10/1 | " | 26a | — | 614 | — | — |

TABLE VIII-continued

| Example | Cure | SiH/ SiVi | Polymer Visc. | Adh* oz/in | Hold (°F.) | Tack (grams) | Solids (%) | Comp. Visc. |
|---|---|---|---|---|---|---|---|---|
| 40 | 1 | 100/1 | gum | 44a | <300 | 990 | 50 | 50M |
| 41 | 3 | 25/1 | gum | 30a | <400 | 1046 | — | — |

*c = cohesive failure. a = adhesive failure. ac = adhesive/cohesive failure.
**M = × 1,000 (e.g., 69M = 69,000 cP).

TABLE IX

| Example | DEF, % | BzOH, % | Pt, % | Pt/DEF | BzOH/ DEF |
|---|---|---|---|---|---|
| 26 | 2.5 | — | — | 0.00 | 0.0 |
| 27 | 0.15 | 0.6 | 0.375 | 2.50 | 4.0 |
| 28 | 2.5 | — | — | 0.00 | 0.0 |
| 29 | 1.5 | 3.0 | 0.75 | 0.50 | 2.0 |
| 30 | 0.3 | 0.3 | 0.75 | 2.50 | 1.0 |
| 31 | 1.5 | — | 2.25 | 1.50 | 0.0 |
| 32 | 0.3 | 0.6 | 0.375 | 1.25 | 2.0 |
| 33 | 0.3 | 0.6 | 0.375 | 1.25 | 2.0 |
| 34 | 2.5 | — | — | 0.00 | 0.0 |
| 35 | 0.75 | — | 0.75 | 1.00 | 0.0 |
| 36 | 1.5 | 3.0 | 0.75 | 0.50 | 2.0 |
| 37 | 1.5 | 3.0 | 0.75 | 0.50 | 2.0 |
| 38 | 1.5 | — | 2.25 | 1.50 | 0.0 |
| 39 | 0.75 | — | 0.75 | 1.00 | 0.0 |
| 40 | 0.1 | — | 0.375 | 3.75 | 0.0 |
| 41 | 0.3 | 0.6 | 0.75 | 2.50 | 2.0 |

The results in Tables VIII and IX show that the high-solids, low-viscosity silicone pressure sensitive adhesive compositions of this invention have excellent adhesive strength, tack and hold properties.

EXAMPLES 42-49

Eight compositions were prepared by mixing appropriate amounts of Resin E (80% in xylene) and Polymer G, to provide a resin/polymer ratio of 72/28, and a sufficient amount of Crosslinking Agent A, to provide molar amounts of silicon-bonded hydrogen for every silicon-bonded vinyl radical in Polymer G which ranged from 1/1 to 128/1, as noted in Table X. A vinylsiloxane complex of chloroplatinic acid and a platinum catalyst inhibitor was also added.

The compositions were cast as 1.5 mil films on 1-mil Kapton ™ backing and heated at 130° C. for 6 minutes for compositions having an SiH/SiVi ratio of 16 or less and at 130° C. for 4 minutes for compositions having an SiH/SiVi ratio of greater than 16. The test results are summarized in Table X.

EXAMPLES 50-57

The compositions of Examples 42-49 were prepared again, except 0.375% of a vinylsiloxane complex of chloroplatinic acid dissolved in Polymer I, 0.3% of diethyl fumarate and 0.6% of benzyl alcohol, all based on the weight of Polymer G, were used. The compositions were cast as 1.5 mil films on 1-mil Kapton ™ backing, the films were heated for 2 minutes at 70° C. to remove solvent and the solvent-free films were exposed for 20 seconds to the ultraviolet radiation of two mercury vapor lamps each having an output of 200 watts per inch. The peel adhesion, tack and 5-day hold temperature values for these compositions are listed in Table X.

TABLE X

| Example | SiH/ SiVi | Adhesion (oz/in*) | Hold (°F.) | Tack (grams) |
|---|---|---|---|---|
| 42 | 1/1 | 16c | — | 680 |
| 43 | 2/1 | 13c | — | 608 |
| 44 | 4/1 | 60ac | — | 1250 |
| 45 | 8/1 | 52a | 400 | 1340 |
| 46 | 16/1 | 56a | 400 | 1134 |
| 47 | 32/1 | 42a | 400 | 918 |
| 48 | 64/1 | 48a | 400 | 1503 |
| 49 | 128/1 | 28a | 400 | 1384 |
| 50 | 1/1 | 15c | — | 477 |
| 51 | 2/1 | 22c | — | 576 |
| 52 | 4/1 | 48a | 400 | 431 |
| 53 | 8/1 | 49a | 400 | 703 |
| 54 | 16/1 | 65ac | 400 | 878 |
| 55 | 32/1 | 58a | 400 | 963 |
| 56 | 64/1 | 52c | 400 | 1252 |
| 57 | 128/1 | 26a | 400 | 995 |

*c = cohesive failure; a = adhesive failure; ac = adhesive/cohesive failure.

The results in Table X indicate that a SiH/SiVi ratio of greater than 4.0 is required to provide both heat-cured and UV-cured silicone pressure sensitive adhesives which possesses predominantly adhesive failure during peel release.

EXAMPLES 58-62

Five compositions were prepared by mixing appropriate amounts of Resin E (80% in xylene) and Polymer G to provide compositions having a resin/polymer ratio which ranged from 68/32 to 76/24, and a sufficient amount of Crosslinking Agent A, to provide 44 moles of silicon-bonded hydrogen for every mole of silicon-bonded vinyl radical in Polymer G. A catalytic amount of a vinylsiloxane complex of chloroplatinic acid dissolved in Polymer I, a cure inhibiting amount of diethyl fumarate were added to the resulting compositions. The catalyzed compositions were cast as 3 mil wet films on 1-mil Kapton ™ backing and cured by heating the coated film at 130° C. for 4 minutes.

The peel adhesion values were 23a, 36a, 42a, 70c and 80c oz/in for compositions having resin/polymer ratios of 68/32, 70/30, 72/28, 74/26 and 76/24, respectively, where c and a have the meanings noted in Table X. The finger tack was judged to be excellent for all but the 76/24 composition which was judged to have good finger tack.

EXAMPLE 63

A composition comprising Resin E (80% in xylene) and Polymer H in a resin/polymer ratio of 70/30, and having a sufficient amount of Crosslinking Agent C, to provide 2 moles of silicon-bonded hydrogen for every mole of silicon-bonded vinyl radical in Polymer H. A vinylsiloxane complex of chloroplatinic acid and a platinum catalyst inhibitor were also added. The cured adhesive exhibited a peel adhesion value of 31 oz/in, a tack value of 1223 grams and a hold temperature of 400° F.

EXAMPLE 64

A composition comprising Resin E (80% in xylene) and Polymer I in a resin/polymer ratio of 70/30, a sufficient amount of crosslinking agent consisting of a mixture of Crosslinking Agents A and C, to provide 2 moles of silicon-bonded hydrogen for every mole of silicon-bonded vinyl radical in Polymer I. A vinylsiloxane complex of chloroplatinic acid and a platinum catalyst inhibitor were also added. The cured adhesive exhibited a peel adhesion value of 15 oz/in, and a tack value of 868 grams.

EXAMPLES 65-66

Two compositions were prepared using resinous crosslinkers. Resin E (80% in xylene) was mixed with Polymer H in a 70/30 resin to polymer ratio and a sufficient amount of Crosslinking Agent D for Example 65 and Crosslinking Agent E for Example 66, to provide a 10 moles of silicon bonded hydrogen for every mole of silicon bonded vinyl radical in Polymer H. Catalytic levels of a vinylsiloxane complex of chloroplatinic acid and a platinum catalyst inhibitor, diethyl fumerate were also added. The samples were cast as 1.5 mil adhesive films on a 1 mil Kapton TM backing and cured at 130° C. for four minutes.

The adhesive from Example 65 had a peel adhesion of 31 oz/in. The adhesive from Example 66 had a peel adhesion of 40 oz/in.

EXAMPLES 67-75

Silicone PSAs having resin to polymer ratios in the range 43/57 to 87/13 were prepared according to the procedures of Examples 1-4 using Resins H through O as the organopolysiloxane (A) component and using SiH-functional Crosslinking Agent F. These formulations were cured on 2 mil Mylar TM film and tested as before, adhesion to Teflon TM being added to the evaluations. The results are presented in Tables XI through XIX, respectively.

Likewise, PSAs prepared according to the procedures of Examples 5-8 using Resins H through O were prepared using a peroxide cure system. In each of these PSAs only one resin/polymer ratio was employed for each example, this being the ratio which provided the optimum adhesion on Teflon TM for the corresponding SiH-cured system above. The test results of these peroxide-cured PSAs are also presented in Tables XI through XIX, respectively, as indicated by entries displaying an asterisk alongside the resin/polymer weight ratio (first column of each table).

TABLE XI (Comparative) Example 67 (Resin H)

| Resin/Polymer Weight Ratio | Adhesion (oz/in) | | | Probe Tack (g) |
|---|---|---|---|---|
| | Steel | PE | TEFLON TM | |
| 43/57 | 0a | 0a | 0a | 100 |
| 50/50 | 0a | 0a | 0a | 110 |
| 56/44 | 0a | 0a | 0a | 120 |
| 62/38 | 0a | 0a | 0a | 130 |
| 67/33 | 0a | 0a | 0a | 140 |
| 72/28 | 0a | 0a | 0a | 140 |
| 77/23 | 0a | 0a | 0a | 165 |
| 82/18 | 0a | 0a | 0a | 0 |
| 87/13 | 0a | 0a | 0a | 0 |
| 82/18* | 0a | 0a | 0a | 55 |

*Peroxide-cured as in Examples 5-8
a = adhesive failure; c = cohesive failure

TABLE XII

Example 68 (Resin I)

| Resin/Polymer Weight Ratio | Adhesion (oz/in) | | | Probe Tack (g) |
|---|---|---|---|---|
| | Steel | PE | TEFLON TM | |
| 43/57 | 2a | 0a | 0a | 150 |
| 50/50 | 3a | 0a | 0a | 250 |
| 56/44 | 3a | 1a | 0a | 330 |
| 62/38 | 3a | 2a | 1a | 415 |
| 67/33 | 5a | 6a | 4a | 555 |
| 72/28 | 18a | 17a | 11a | 740 |
| 77/23 | 34c | 28c | 30c | 710 |
| 82/18 | 24c | 26c | 24c | 300 |
| 87/13 | 31c | 32c | 32c | 305 |
| 77/23* | 44c | 45c | 43c | 715 |

*Peroxide-cured as in Examples 5-8
a = adhesive failure; c = cohesive failure

TABLE XIII

Example 69 (Resin J)

| Resin/Polymer Weight Ratio | Adhesion (oz/in) | | | Probe Tack (g) |
|---|---|---|---|---|
| | Steel | PE | TEFLON TM | |
| 43/57 | 1a | 0a | 0a | 235 |
| 50/50 | 2a | 0a | 0a | 310 |
| 56/44 | 3a | 2a | 1a | 370 |
| 62/38 | 4a | 4a | 3a | 415 |
| 67/33 | 8a | 13a | 10a | 740 |
| 72/28 | 24a | 34a | 22a | 990 |
| 77/23 | 48c | 46c | 40c | 1170 |
| 82/18 | 54c | 50c | 49c | 370 |
| 87/13 | 0c | 0a | 0 | 0 |
| 77/23* | 54c | 49c | 47c | 1050 |

*Peroxide-cured as in Examples 5-8
a = adhesive failure; c = cohesive failure

TABLE XIV

Example 70 (Resin K)

| Resin/Polymer Weight Ratio | Adhesion (oz/in) | | | Probe Tack (g) |
|---|---|---|---|---|
| | Steel | PE | TEFLON TM | |
| 43/57 | 0a | 0a | 0a | 270 |
| 50/50 | 1a | 0a | 0a | 340 |
| 56/44 | 3a | 1a | 1a | 495 |
| 62/38 | 8a | 6a | 3a | 700 |
| 67/33 | 22a | 16a | 12a | 1140 |
| 72/28 | 44a | 28a | 18a | 1465 |
| 77/23 | 64c | 71c | 56c | 1260 |
| 82/18 | 72c | 3c | 0a | 65 |
| 87/13 | 0a | 0a | 0a | 0 |
| 77/23* | 72c | 70c | 50c | 1400 |

*Peroxide-cured as in Examples 5-8
a = adhesive failure; c = cohesive failure

TABLE XV (Comparative) Example 71 (Resin L)

| Resin/Polymer Weight Ratio | Adhesion (oz/in) | | | Probe Tack (g) |
|---|---|---|---|---|
| | Steel | PE | TEFLON TM | |
| 43/57 | 8a | 2a | 2a | 445 |
| 50/50 | 20a | 5a | 4a | 445 |
| 56/44 | 33a | 13a | 9a | 560 |
| 62/38 | 54a | 28a | 17a | 600 |
| 67/33 | 72a | 12a | 5a | 265 |
| 72/28 | 72a | 0a | 0a | 40 |
| 77/23 | 8a | 0a | 0a | 0 |
| 82/18 | 8a | 0a | 0a | 0 |
| 87/13 | 0a | 0a | 0a | 0 |
| 62/38* | 59a | 22a | 16a | 715 |

*Peroxide-cured as in Examples 5-8
a = adhesive failure; c = cohesive failure

TABLE XVI (Comparative) Example 72 (Resin M)

| Resin/Polymer Weight Ratio | Adhesion (oz/in) | | | Probe Tack (g) |
|---|---|---|---|---|
| | Steel | PE | TEFLON ™ | |
| 43/57 | 7a | 4a | 3a | 460 |
| 50/50 | 24a | 0a | 0a | 575 |
| 56/44 | 39a | 6a | 6a | 560 |
| 62/38 | 51a | 8a | 2a | 370 |
| 67/33 | 54a | 0a | 0a | 80 |
| 72/28 | 4a | 0a | 0a | 0 |
| 77/23 | 0a | 0a | 0a | 0 |
| 82/18 | 0a | 0a | 0a | 0 |
| 87/13 | 0a | 0a | 0a | 0 |
| 56/44* | 54a | 12a | 9a | 320 |

*Peroxide-cured as in Examples 5-8
a = adhesive failure; c = cohesive failure

TABLE XVII (Comparative) Example 73 (Resin N)

| Resin/Polymer Weight Ratio | Adhesion (oz/in) | | | Probe Tack (g) |
|---|---|---|---|---|
| | Steel | PE | TEFLON ™ | |
| 43/57 | 8a | 1a | 0a | 445 |
| 50/50 | 31a | 5a | 3a | 475 |
| 56/44 | 44a | 7a | 5a | 435 |
| 62/38 | 60a | 8a | 3a | 85 |
| 67/33 | 72c | 1a | 0a | 0 |
| 72/28 | 0a | 0a | 0a | 0 |
| 77/23 | 0a | 0a | 0a | 0 |
| 82/18 | 0a | 0a | 0a | 0 |
| 87/13 | 0a | 0a | 0a | 0 |
| 56/44* | 43a | 8a | 4a | 320 |

*Peroxide-cured as in Examples 5-8
a = adhesive failure; c = cohesive failure

TABLE XVIII (Comparative) Example 74 (Resin N-1)

| Resin/Polymer Weight Ratio | Adhesion (oz/in) | | | Probe Tack (g) |
|---|---|---|---|---|
| | Steel | PE | TEFLON ™ | |
| 43/57 | 5a | 3a | 2a | 340 |
| 50/50 | 12a | 8a | 3a | 525 |
| 56/44 | 23a | 12a | 10a | 700 |
| 62/38 | 60a | 28a | 23a | 1190 |
| 67/33 | 72a | 56a | 34a | 1610 |
| 72/28 | 72c | 40c | 30c | 50 |
| 77/23 | 0c | 0a | 0a | 0 |
| 82/18 | 0a | 0a | 0a | 0 |
| 87/13 | 0a | 0a | 0a | 0 |
| 67/33* | 32c | 36c | 25a | 1161 |

*Peroxide-cured as in Examples 5-8
a = adhesive failure; c = cohesive failure

TABLE XIX (Comparative) Example 75 (Resin O)

| Resin/Polymer Weight Ratio | Adhesion (oz/in) | | | Probe Tack (g) |
|---|---|---|---|---|
| | Steel | PE | TEFLON ™ | |
| 43/57 | 13a | 1a | 0a | 570 |
| 50/50 | 32a | 5a | 3a | 480 |
| 56/44 | 36a | 6a | 4a | 230 |
| 62/38 | 41a | 5a | 3a | 160 |
| 67/33 | 36a | 0a | 0a | 50 |
| 72/28 | 0a | 0a | 0a | 0 |
| 77/23 | 0a | 0a | 0a | 0 |
| 82/18 | 0a | 0a | 0a | 0 |
| 87/13 | 0a | 0a | 0a | 0 |
| 56/44* | 37a | 6a | 4a | 260 |

*Peroxide-cured as in Examples 5-8
a = adhesive failure; c = cohesive failure

The above results were repeated using a 1 mil thick KAPTON ™ substrate. Table XX presents the peel adhesion results, in summary form, for the optimum resin/polymer ratio PSAs which were cured using the above described SiH crosslinker. The resin $M_n$ values reported in Table XX are based on the PS standard, as described supra.

TABLE XX

| Example | Resin | Resin $M_n$ | Resin M/Q Ratio | Maximum Adhesion to TEFLON ™ | |
|---|---|---|---|---|---|
| | | | | KAPTON ™ (oz/in) | MYLAR ™ (oz/in) |
| 67 | H | 766 | 1.5 | 0 | 0 |
| 68 | I | 958 | 1.4 | 22 | 30 |
| 69 | J | 1037 | 1.4 | 33 | 40 |
| 70 | K | 1191 | 1.3 | 40 | 56 |
| 71 | L | 1633 | 1.1 | 12 | 17 |
| 72 | M | 1832 | 1.0 | 7 | 6 |
| 73 | N | 1841 | 1.0 | 8 | 5 |
| 74 | N-1 | 1463 | 1.0 | 18 | 34 |
| 75 | O | 2322 | 1.0 | 6 | 4 |

The peel adhesion (Mylar ™ backing) of the PSAs having optimum resin/polymer ratios and using the SiH cure system shown in the above tables are also plotted against the number average molecular weight (PS standard) of the respective resin component in FIG. 1 (polyethylene substrate) and FIG. 2 (PTFE substrate). From the tables, as well as FIGS. 1 and 2, it can be seen that the silicone PSAs of the present invention exhibit unexpectedly high adhesion to the two low energy substrates relative to systems wherein the resin component is outside the critical $M_n$ (PS standard) of about 950 to 1600 and the critical M/Q ratio of 1.1 to 1.4.

It is noted that (Comparative) Example 74, which employs Resin N-1, also provided relatively good adhesion to PE and Teflon ™. However, the resin used to form this PSA was only a fraction of its "as-formed" counterpart, Resin N. The PSA based on Resin N-1, which had an M/Q ratio of 1.00, is thus an illustration of the low polydispersity compositions taught in EPO 0 255,226, cited supra, and is outside the scope of the present invention. And, as stated above, this EPO publication teaches away from the use of silicone resins having M/Q ratios exceeding 1.0.

COMPARATIVE EXAMPLE 76

A silicone resin was prepared according to the procedure described in Example 1 of U.S. Pat. No. 3,929,704 to Horning, cited supra, as follows. A 1,000 ml flask equipped with a condenser, thermometer and addition funnel was charged with 108 g of trimethylchlorosilane, 374 g of ethylorthosilicate and 250 g of toluene. This solution was stirred and heated to 40° C. over a ten minute period and maintained at 40° C. for an additional five minutes. Water (144 g) was then added at a rate sufficient to maintain the reaction temperature in the range 72°-78° C. The resulting mixture was stirred for an additional hour and then phase separated. The resin/solvent phase was neutralized and dried with sodium bicarbonate and magnesium sulfate, respectively. After filtration through a pressure filter, the solution was found to have a solids content of 44%. This solution was partially stripped under vacuum to provide a solution containing 64 weight percent resin solids.

Analysis of the above resin by $^{29}Si$ nmr showed the following mole percentages, wherein R denotes a methyl radical:

M units (i.e., $R_3SiO_{\frac{1}{2}}$) = 40.6%
M (neopentamer) units = 0.2%

TOH units (i.e., HOSiO$_{3/2}$) = 18.5%
Q units (i.e., SiO$_2$) = 40.8%
Q (neopentamer) < 0.1%
Thus, according to the previously stated convention used herein.

$$M/Q = (40.6 + 0.2)/40.8 = 1.0$$

Gel permeation chromatography evaluation of the above resin using the resin calibration showed a M$_n$ of 1,771, which corresponds to a M$_n$ of 905 on a polystyrene calibration (excluding the neopentamer peak).

The above resin solution was employed in the preparation of various silicone pressure-sensitive adhesives; one series of PSAs was prepared using the platinum-catalyzed hydrosilation cure system according to Examples 1–4 while another series of PSAs was formulated with a peroxide cure system according to Examples 5–8. The test results on these PSAs showing adhesion to steel and polyethylene (PE) as well as tack are presented in Table XXI, wherein the first column indicates the weight ratio of resin to polymer (R/P) used.

TABLE XXI

| R/P | Hydrosilation-Cured PSAs Adhesion (oz/in)* | | | Peroxide-Cured PSAs Adhesion (oz/in)* | | |
|---|---|---|---|---|---|---|
| | Steel | PE | Tack (g) | Steel | PE | Tack (g) |
| 43/57 | 1c | 0c | 162 | 8a | 2a | 60 |
| 50/50 | 1c | 2c | 286 | 10a | 2a | 85 |
| 56/44 | 0a | 2a | 80 | 9a | 3a | 90 |
| 62/38 | 1c | 3c | 25 | 8a | 2a | 40 |
| 67/33 | 0a | 0a | 15 | 7a | 0a | 0 |
| 72/28 | 3a | 0c | 28 | 7c | 0a | 0 |
| 77/23 | 0a | 0a | 25 | 0a | 0a | 0 |
| 82/18 | 0a | 0a | 50 | 0a | 0a | 0 |
| 87/13 | 0a | 0a | 75 | 0a | 0a | 0 |

*a = adhesive failure; c = cohesive failure

The following examples illustrate the preparation and testing of System IV (solventless) PSAs of the present invention. A separate determination on a representative model composition indicated that the stripping conditions reported herein would result in a volatile content of less than 1% by weight. In all of these examples, the adhesion values reported are to steel panels.

EXAMPLE 77

A 267 gram mixture of Resin P solution and Polymer L with a resin to polymer ratio of 72/28 based on solids, was prepared. The volatiles were removed by vacuum stripping at 130° C. and 1–2 millimeters of mercury for one hour. To 7.0 grams of the devolatilized mixture was added 0.012 grams of bis-(methoxymethyl)ethyl maleate, 0.06 grams of a platinum complex of a vinylsiloxane and the amount of Crosslinking Agent M as listed in Table XXII for each example. The compositions were cast to give a 1.5 to 2.0 mil cured film on 1-mil Kapton TM. Cure was achieved by heating for six minutes at 130° C. in a laboratory convection oven. The test results are summarized in Table XXII.

TABLE XXII

| EXAMPLE | X-LINK (gms) | SiH/SiV* | HOLD TIME (400° F.) | Adhesion | FINGER TACK |
|---|---|---|---|---|---|
| 77A | 0.07 | 1.5/1.0 | PASS | 28a** | AVG |
| 77B | 0.15 | 3.4/1.0 | FAIL | 34a** | LOW |
| 77C | 0.25 | 5.6/1.0 | FAIL | 34a** | LOW-AVG |
| 77D | 0.30 | 6.7/1.0 | FAIL | 31a** | AVG |
| 77E | 0.35 | 7.9/1.0 | PASS | 28a** | HIGH |
| 77F | 0.45 | 10.1/1.0 | — | 27a** | HIGH |

*Ratio of silicon-bonded hydrogen groups to silicon-bonded vinyl groups.
**The letter a indicates that 100% adhesive failure was observed.

EXAMPLE 78

A 267 gram mixture of Resin P solution and Polymer L with a resin to polymer ratio of 72/28 based on solids, was prepared. The volatiles were removed by vacuum stripping at 130° C. and 1–2 millimeters of mercury for one hour. To 7.0 grams of the devolatilized mixture was added 0.012 grams of bis-(methoxymethyl)ethyl maleate, 0.06 grams of a platinum complex of a vinylsiloxane and 0.30 grams of Crosslinking Agent M. The compositions were cast to give a 1.5 to 2.0 mil u cured film on 2-mil Mylar TM. Cure was achieved by heating for two to ten minutes at 130° C. in a laboratory convection oven. The test results are summarized in Table XXIII.

TABLE XXIII

| Composition | Cure Time | Adhesion | Finger Tack |
|---|---|---|---|
| 78A | 2 min. | 47a** | HIGH |
| 78B | 4 min. | 53a** | HIGH |
| 78C | 6 min. | 55a** | HIGH |
| 78D | 8 min. | 53a** | HIGH |
| 78E | 10 min. | 53a** | AVG |

**The letter a indicates that 100% adhesive failure was observed.

EXAMPLE 79

A 250 gram mixture of Resin P solution and Polymer L with a resin to polymer ratio of 70/30 based on solids, was prepared. The volatiles were removed by vacuum stripping in a 2×8 inch vertical thin film stripper at 120° C. and 60 millimeters of mercury for one hour. To 5.0 grams of the devolatilized mixture was added 0.02 grams of diethyl fumerate, 0.02 grams of a platinum complex of a vinylsiloxane and the amount and type of crosslinking agent as listed in Table XXIV for each example. The compositions were cast to give a 1.5 to 2.0 mil cured film on 1-mil Kapton TM. Cure was achieved by heating for four minutes at 130° C. in a laboratory convection oven. The test results are summarized in Table XXIV.

TABLE XXIV

| Composition | Cross Linking Agent (type) | (wt %) | SiH/SiVi* | Adhesion | Finger Tack |
|---|---|---|---|---|---|
| 79A | A | | 1.5/1.0 | 15c** | LOW |
| 79B | A | | 2.0/1.0 | 14c*** | LOW |
| 79C | G | | 2.0/1.0 | 7a** | HIGH |
| 79D | H | | 2.0/1.0 | 16a** | HIGH |

*Ratio of silicon-bonded hydrogen groups to silicon-bonded vinyl groups.
**The letter a indicates that 100% adhesive failure was observed.
***c indicated cohesive failure

EXAMPLE 80

A mixture of 200 grams of the Resin P solution and 65 grams of the Polymer L was prepared. The volatiles were removed by vacuum stripping at 130° C. and 1–2 millimeters of mercury for one hour. To 7.0 grams of the devolatilized mixture was added 0.012 grams of bis-(methoxymethyl)ethyl maleate, 0.06 grams of a platinum complex of a vinylsiloxane and the amount and type of crosslinking agent as listed in Table XXV for each example. Crosslinking agents F, I, J and K were used which are trimethylsiloxy terminated methylhydrogenpolysiloxane having an average degree of polymerization of between 5 and 40. Additional amounts of Polymer L were added so as to maintain a constant resin to polymer ratio while varying the SiH to SiVi ratios. The compositions were cast to give a 1.5 to 2.0 mil cured film on 2-mil Mylar TM. Cure was achieved by heating for six minutes at 130° C. in a laboratory convection oven. The test results are summarized in Table XXV.

TABLE XXV

| EXAMPLE | Cross Linking Agent (type) | (gms) | SiH/SiVi* | Adhesion | FINGER TACK |
|---|---|---|---|---|---|
| 80A | I | 0.05 | 1.5/1.0 | 52a** | HIGH |
| 80B | I | 0.10 | 3.0/1.0 | 56a** | AVG |
| 80C | I | 0.20 | 6.0/1.0 | 55a** | AVG |
| 80D | J | 0.04 | 1.5/1.0 | 52a** | AVG-HIGH |
| 80E | J | 0.08 | 3.0/1.0 | 48a** | LOW |
| 80F | J | 0.18 | 6.0/1.0 | 46a** | LOW-NONE |
| 80G | K | 0.04 | 1.5/1.0 | 40a** | LOW |
| 80H | K | 0.08 | 3.0/1.0 | 50a** | LOW-NONE |
| 80I | K | 0.15 | 6.0/1.0 | 56a** | LOW-NONE |
| 80J | F | 0.04 | 1.5/1.0 | 52a** | AVG |
| 80K | F | 0.07 | 3.0/1.0 | 57a** | LOW |
| 80L | F | 0.14 | 6.0/1.0 | 61a** | NONE |

*Ratio of silicon-bonded hydrogen groups to silicon-bonded vinyl groups.
**The letter a indicates that 100% adhesive failure was observed.

EXAMPLE 81

A 250 gram mixture of Resin P solution and Polymer L with a resin to polymer ratio of 70/30 based on solids, was prepared. The volatiles were removed by vacuum stripping in a 2×8 inch vertical thin film stripper at 120° C. and 60 millimeters of mercury for one hour. To 5.0 grams of the devolatilized mixture was added 0.02 grams of diethyl fumerate, 0.02 grams of a platinum complex of a vinylsiloxane and the amount and type of crosslinking agent as listed in Table XXVI 2.0 mil cured film on 1-mil Kapton TM. Cure was achieved by heating for four minutes at 130° C. in a laboratory convection oven. The test results are summarized in Table XXVI.

TABLE XXVI

| EXAMPLE | Cross Linking Agent (type) | SiH/SiVi* | ADHESION | TACK (gms) | HOLD 5-DAY (°F.) |
|---|---|---|---|---|---|
| 81A | D | 2.1/1.0 | 35a** | 990 | 400 |
| 81B | D | 1.8/1.0 | 41a** | 1100 | 400 |
| 81C | D | 1.4/1.0 | 32a** | 915 | 400 |
| 81D | E | 4.9/1.0 | 28a** | 650 | 400 |
| 81E | E | 4.1/1.0 | 26a** | 480 | — |
| 81F | E | 3.1/1.0 | 24a** | 440 | — |
| 81G | E | 1.5/1.0 | 27a** | 565 | — |
| 81H | L | 2.5/1.0 | 34a** | 775 | 400 |
| 81I | L | 1.8/1.0 | 33a** | 745 | <400 |
| 81J | L | 1.1/1.0 | 36a** | 1110 | — |

*Ratio of silicon-bonded hydrogen groups to silicon-bonded vinyl groups.
**The letter a indicates that 100% adhesive failure was observed.

EXAMPLE 82

A 250 gram mixture of Resin P solution and Polymer L with a resin to polymer ratio of 70/30 based on solids, was prepared. The volatiles were removed by vacuum stripping in a 2×8 inch vertical thin film stripper at 120° C. and 60 millimeters of mercury for one hour. To 5.0 grams of the devolatilized mixture was added 0.01 grams of diethyl fumerate. 0.02 grams of benzyl alcohol, 0.01 grams of a platinum complex of a vinylsiloxane and the amount and type of crosslinking agent as listed in Table XXVII for each example. The compositions were cast to give a 1.5 to 2.0 mil cured film on 1-mil Kapton TM. Cure was achieved by passing the coated film five times under a pair of mercury vapor lamps, as described in Examples 26-39.

TABLE XXVII

| EXAMPLE | Cross Linking Agent (type) | SiH/SiVi* | ADHESION | TACK (gms) | HOLD 5-DAY (°F.) |
|---|---|---|---|---|---|
| 82A | M | 1.5/1.0 | 24a** | 240 | — |
| 82B | H | 3.0/1.0 | 20a** | 995 | 400 |
| 82C | L | 2.5/1.0 | 32a** | 965 | — |
| 82D | L | 1.8/1.0 | 40a** | 350 | — |
| 82E | D | 2.1/1.0 | 36a** | 1110 | — |
| 82F | D | 1.8/1.0 | 38a** | 895 | 400 |

*Ratio of silicon-bonded hydrogen groups to silicon-bonded vinyl groups.
**The letter a indicates that 100% adhesive failure was observed.

EXAMPLE 83

A 100 gram mixture of Resin Q solution and Polymer L with a resin to polymer ratio of 83/17 based on solids, was prepared. The volatiles were removed by vacuum stripping at 130° C. and 2 millimeters of mercury for two hour. To 5.0 grams of the devolatilized mixture was added 0.02 grams of diethyl fumerate, 0.02 grams of a platinum complex of a vinylsiloxane and the amount and type of crosslinking agent as listed in Table XXVIII for each example. Additional amounts of Polymer L were added to adjust the resin to polymer ratio to the levels indicated in Table XXVIII. The compositions were cast to give a 1.5 to 2.0 mil cured film on 1-mil Kapton TM. Cure was achieved by heating for four minutes at 130° C. in a laboratory convection oven. The test results are summarized in Table XXVIII.

TABLE XXVIII

| EXAMPLE | Cross Linking Agent (type) | Resin/Polymer | SiH/SiVi* | Adhesion | TACK (gms) | FINGER TACK |
|---|---|---|---|---|---|---|
| 83A | D | 76/24 | 1.8/1.0 | 14a** | 890 | HIGH |
| 83B | D | 78/22 | 1.8/1.0 | 24c*** | 925 | HIGH |
| 83C | D | 80/20 | 1.8/1.0 | 35c*** | 990 | HIGH |
| 83D | D | 83/17 | 1.8/1.0 | 38c*** | 535 | AVG |
| 83E | M | 78/22 | 1.8/1.0 | 16a** | 880 | AVG-HI |
| 83F | M | 80/20 | 1.8/1.0 | 23c*** | 625 | AVG |

TABLE XXVIII-continued

| EXAMPLE | Cross Linking Agent (type) | Resin/ Polymer | SiH/SiVi* | Adhesion | TACK (gms) | FINGER TACK |
|---|---|---|---|---|---|---|
| 83G | M | 83/17 | 1.8/1.0 | 30c*** | 50 | LOW-NO |

*Ratio of silicon-bonded hydrogen groups to silicon-bonded vinyl groups.
**The letter a indicates that 100% adhesive failure was observed.
***The letter c indicates that some degree of cohesive failure was observed.

EXAMPLE 84

A 250 gram mixture of Resin P solution and Polymer M with a resin to polymer ratio of 70/30 based on solids, was prepared. The volatiles were removed by vacuum stripping in a 2×8 inch vertical thin film stripper at 120° C. and 60 millimeters of mercury for one hour. To 5.0 grams of the devolatilized mixture was added 0.02 grams of diethyl fumerate, 0.02 grams of a platinum complex of a vinylsiloxane and the amount of Crosslinking Agent A as listed in Table XXIX for each example. The compositions were cast to give a 1.5 to 2.0 mil cured film on 1-mil Kapton TM. Cure was achieved by heating for four minutes at 130° C. in a laboratory convection oven. The test results are summarized in Table XXIX.

TABLE XXIX

| EXAMPLE | Cross Linking Agent (type) | SiH/SiVi* | ADHESION | Finger Tack |
|---|---|---|---|---|
| 84A | M | 1.5/1.0 | 21a** | AVG |
| 84B | M | 1.0/1.0 | 17a** | AVG |

*Ratio of silicon-bonded hydrogen groups to silicon-bonded vinyl groups.
**The letter a indicates that 100% adhesive failure was observed.

That which is claimed is:

1. A silicone pressure sensitive adhesive composition consisting essentially of:
    (A) 60 to 90 parts by weight of a soluble organopolysiloxane having a $M_n$ value of about 950 to 1,600 and consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least ⅓ of all R radicals being methyl and the mole ratio of $R_3SiO_{\frac{1}{2}}$ siloxane units to $SiO_{4/2}$ siloxane units in the soluble organopolysiloxane having a value of from 1.1/1 to 1.4/1; and
    (B) 10 to 40 parts by weight of a polydiorganosiloxane having the general formula $R^1R^2{}_2SiO(R^2{}_2SiO)_nSiR^2{}_2R^1$ wherein each $R^2$ denotes a monovalent radical selected from the group consisting of hydrocarbon and halogenated hydrocarbon radicals, at least ⅓ of all $R^2$ radicals being methyl, each $R^1$ denotes a radical selected from the group consisting of $R^2$ radicals and OH radicals and the subscript n is a number having an average value of at least 50.

2. The composition according to claim 1, further containing an effective amount of a nonreactive solvent.

3. The composition according to claim 2, wherein the non-reactive solvent is selected from the group consisting of hydrocarbons, volatile siloxanes, halohydrocarbons, alcohols, esters, ketones and mixtures thereof.

4. The composition according to claim 1, wherein component (A) consists essentially of $(CH_3)_3SiO_{\frac{1}{2}}$ siloxane units and $SiO_{4/2}$ siloxane units and component (B) is a polydiorganosiloxane having the general formula $R''R'{}_2SiO(R'{}_2SiO)_nSiR'{}_2R''$ wherein each $R'$ denotes methyl, phenyl or alkenyl, at least 85 percent of which are methyl radicals, each $R''$ denotes a radical selected from the group consisting of $R'$ radicals and OH radicals and the subscript n is a number having an average value of greater than 200.

5. The composition of claim 4, further comprising an effective amount of a crosslinking agent.

6. The composition of claim 5, wherein the crosslinking agent is an organic peroxide.

7. The composition of claim 6, wherein the organic peroxide is benzoyl peroxide.

8. The composition according to claim 1, wherein at least two of the $R^2$ radicals of said polydiorganosiloxane (B) are alkenyl radicals, said composition further containing (C) an effective amount of an organohydrogenpolysiloxane crosslinking agent having an average of at least 2 silicon-bonded hydrogen atoms in each molecule and (D) a catalytic amount of a platinum group metal-containing catalyst for the addition reaction of alkenyl radicals with silicon-bonded hydrogen atoms.

9. The composition according to claim 8, wherein said component (A) consists essentially of $(CH_3)_3SiO_{\frac{1}{2}}$ siloxane units and $SiO_{4/2}$ siloxane units and at least 85 percent of the $R^2$ radicals of said polydiorganosiloxane (B) are methyl radicals.

10. The composition of claim 9, wherein said organohydrogenpolysiloxane is a methylhydrogenpolysiloxane.

11. The composition of claim 10, wherein said methylhydrogenpolysiloxane is a linear methylhydrogenpolysiloxane.

12. The composition according to claim 9, further containing an effective amount of a nonreactive solvent.

13. The composition of claim 9, wherein said platinum group metal-containing catalyst is a chloroplatinic acid-vinylsiloxane complex.

14. The composition of claim 9, further comprising a platinum catalyst inhibitor.

15. The composition of claim 14, wherein said platinum catalyst inhibitor is selected from the group consisting of 3,5-dimethyl-1-hexyne-3-ene, a dialkyl fumerate, a dialkyl maleate and benzyl alcohol.

16. The composition according to claim 1, wherein said soluble organopolysiloxane (A) has a silicon-bonded hydroxyl content of less than 1 percent by weight, based on the weight of soluble organopolysiloxane.

17. The composition according to claim 4, wherein said soluble organopolysiloxane (A) has a silicon-bonded hydroxyl content of less than 1 percent by weight, based on the weight of soluble organopolysiloxane.

18. The composition according to claim 8, wherein said soluble organopolysiloxane (A) has a silicon-bonded hydroxyl content of less than 1 percent by weight, based on the weight of soluble organopolysiloxane.

19. The composition according to claim 9, wherein said soluble organopolysiloxane (A) has a silicon-bonded hydroxyl content of less than 1 percent by weight, based on the weight of soluble organopolysiloxane.

20. An article coated with the cured composition of claim 1.

21. An article coated with the cured composition of claim 4.

22. An article coated with the cured composition of claim 8.

23. An article coated with the cured composition of claim 9.

24. An article coated with the cured composition of claim 16.

25. An article coated with the cured composition of claim 17.

26. An article coated with the cured composition of claim 18.

27. An article coated with the cured composition of claim 19.

28. A solventless silicone pressure sensitive adhesive composition consisting essentially of:
(A) 60 to 90 parts by weight of a soluble organopolysiloxane having a $M_n$ value of about 950 to 1,600 and consisting essentially of $R_3SiO_{\frac{1}{2}}$ siloxane units and $SiO_{4/2}$ siloxane units wherein each R denotes a monovalent radical selected from the group consisting of hydrocarbon and halogenated hydrocarbon radicals, at least $\frac{1}{3}$ of all R radicals being methyl and the mole ratio of $R_3SiO_{\frac{1}{2}}$ siloxane units to $SiO_{4/2}$ siloxane units in the soluble organopolysiloxane having a value of from 1.1/1 to 1.4/1; and
(B) 10 to 40 parts by weight of a polydiorganosiloxane having the general formula $R^1{}_2R^2SiO(R^1R^2SiO)_nSiR^2R^1{}_2$ wherein each $R^1$ individually is a radical selected from the group consisting of methyl, ethyl, propyl and phenyl, each $R^2$ individually is an olefinic radical or any $R^1$ as defined above with the proviso that at least two $R^2$ radicals per molecule must be olefinic and n has an average value of 50 to 200;
(C) an organohydrogenpolysiloxane compatible with the mixture of (A) and (B) and having an average of at least 2 silicon-bonded hydrogen atoms per molecule, the amount of (C) present in the adhesive composition being sufficient to provide from 1 to 30 silicon bonded hydrogen atoms for every olefinic radical in (B); and
(D) a platinum containing catalyst in sufficient quantity to provide at least 0.1 part by weight platinum for every one million parts by weight of the combined weight of (A), (B) and (C).

29. A solventless silicone pressure sensitive adhesive composition comprising:
(A) 60 to 90 parts by weight of a soluble organopolysiloxane having a $M_n$ value of about 950 to 1,600 and consisting essentially of $Me_3SiO_{\frac{1}{2}}$ siloxane units and $SiO_{4/2}$ siloxane units in a mole ratio of 1.1/1 to 1.4/1, wherein Me denotes a methyl radical;
(B) 10 to 40 parts by weight of a polydiorganosiloxane having the general formula $CH_2=CH(R^1{}_2SiO)_nR^1{}_2SiCH=CH_2$ wherein each $R^1$ individually is a radical selected from the group consisting of methyl, ethyl, propyl and phenyl, and m has an average value of 50 to 200;
(C) an organohydrogenpolysiloxane compatible with the mixture of (A) and (B) and having an average of at least 3 silicon-bonded hydrogen atoms per molecule, the amount of (C) present in the adhesive composition being sufficient to provide from 1 to 30 silicon bonded hydrogen atoms for every olefinically unsaturated radical in the total of (A) plus (B); and
(D) a platinum containing catalyst in sufficient quantity to provide at least 0.1 part by weight platinum for every one million parts by weight of the combined weight of (A), (B) and (C).

30. The composition of claim 28, wherein substantially all R radicals in component (A) are methyl.

31. The composition of claim 28, wherein $R^2$ in component (B) is an olefinic radical containing two to six carbon atoms.

32. The composition of claim 28, wherein the organohydrogenpolysiloxane, component (C), is a linear liquid polysiloxane which contains an average of at least three methylhydrogensiloxy groups.

33. The composition of claim 29, wherein the organohydrogenpolysiloxane, component (C), is a linear liquid polysiloxane which contains an average of at least three methylhydrogensiloxy groups.

34. The composition of claim 28, which comprises from 65 to 75 parts by weight of a soluble organopolysiloxane (A) and from 25 to 35 parts of polydiorganosiloxane (B).

35. The composition of claim 29, which comprises from 65 to 75 parts by weight of a soluble organopolysiloxane (A) and from 25 to 35 parts of polydiorganosiloxane (B).

36. The composition of claim 28, further comprising a platinum catalyst inhibitor.

37. The composition of claim 29 further comprising a platinum catalyst inhibitor.

38. The composition of claim 36, wherein the platinum catalyst inhibitor is diethyl fumarate.

39. The composition of claim 36, wherein the platinum catalyst inhibitor is bis-(methoxymethyl)ethyl maleate.

40. The composition of claim 28, further comprising less than one percent by weight of a solvent.

41. The composition of claim 29, further comprising less than one percent by weight of a solvent.

42. A process for preparing a solventless silicone pressure sensitive adhesive composition comprising:
(I) preparing an organic solvent solution of
(A) 60 to 90 parts by weight of a soluble organopolysiloxane having a $M_n$ value of about 950 to 1,600 and consisting essentially of $Me_3SiO_{\frac{1}{2}}$ siloxane units and $SiO_{4/2}$ siloxane units in a mole ratio of 1.1/1 to 1.4/1, in which Me denotes a methyl radical;
(B) 10 to 40 parts by weight of a polydiorganosiloxane having the general formula $R^2(R^1{}_2SiO)_nSiR^1{}_2R^2$ wherein $R^1$ is independently selected from the group consisting of methyl, ethyl, propyl and phenyl, $R^2$ is an olefinically unsaturated radical and m has an average value of 50 to 200; and
(C) an organohydrogenpolysiloxane compatible with the mixture of (A) and (B) and having an average of at least 3 silicon-bonded hydrogen atoms per molecule, the amount of (C) present in the adhesive composition being sufficient to provide from 1 to 30 silicon bonded hydrogen atoms for every olefinically unsaturated radical in the total of (A) plus (B);

(II) removing organic solvent from the solution to obtain a devolatilized mixture containing less than one percent by weight, based on the total weight of devolatilized mixture, of volatiles; and (III) mixing the devolatilized mixture with
(D) a platinum containing catalyst in sufficient quantity to provide at least 0.1 part by weight platinum for every one million parts by weight of the combined weight of (A), (B) and (C).

43. A process for preparing a solventless silicone pressure sensitive adhesive composition comprising;

(I) preparing an organic solvent solution of
(A) 60 to 90 parts by weight of a soluble organopolysiloxane having a $M_n$ value of about 950 to 1,600 and consisting essentially of $Me_3SiO_{\frac{1}{2}}$ siloxane units and $SiO_{4/2}$ siloxane units in a mole ratio of 1.1/1 to 1.4/1, in which Me denotes a methyl radical, and
(B) 10 to 40 parts by weight of a polydiorganosiloxane having the general formula $R^2(R^1{}_2SiO)_n$-$SiR^1{}_2R^2$ wherein $R^1$ is independently selected from the group consisting of methyl, ethyl, propyl and phenyl, $R^1$ is an olefinically unsaturated radical and m has an average value of 50 to 200;

(II) removing organic solvent from the solution to obtain a devolatilized mixture containing less than one percent of volatiles based on the total weight of devolatilized mixture; and (III) mixing the devolatilized mixture with
(C) an organohydrogenpolysiloxane compatible with the mixture of (A) and (B) and having an average of at least 3 silicon-bonded hydrogen atoms per molecule, the amount of (C) present in the adhesive composition being sufficient to provide from 1 to 30 silicon bonded hydrogen atoms for every olefinically unsaturated radical in the total of (A) plus (B) and
(D) a platinum containing catalyst in sufficient quantity to provide at least 0.1 part by weight platinum for every one million parts by weight of the combined weight of (A), (B) and (C).

44. The process of claim 42, wherein organic solvent is added to produce a composition with less than one percent by weight of said organic solvent.

45. The process of claim 43, wherein organic solvent is added to produce a composition with less than one percent by weight of said organic solvent.

46. An article having on at least one surface thereof the cured composition of claim 28.

47. An article having on at least one surface thereof the cured composition of claim 29.

48. An article having on at least one surface thereof the cured composition of claim 36.

49. A pressure sensitive adhesive tape comprising a flexible support having on at least one surface thereof the cured composition of claim 28.

50. A pressure sensitive adhesive tape comprising a flexible support having on at least one surface thereof the cured composition of claim 29.

51. A pressure sensitive adhesive tape comprising a flexible support having on at least one surface thereof the cured composition of claim 36.

* * * * *